(12) United States Patent
Collopy et al.

(10) Patent No.: US 8,255,275 B2
(45) Date of Patent: Aug. 28, 2012

(54) INCENTIVIZED ADOPTION OF TIME-DEPENDENT INSURANCE BENEFITS

(76) Inventors: Fred Collopy, Cleveland Heights, OH (US); Craig Allen Nard, Shaker Heights, OH (US); Himanshu S. Amin, Solon, OH (US); Gregory Turocy, Moreland Hills, OH (US); Seyed Vahid Sharifi Takieh, Broadview Heights, OH (US); Ronald Charles Krosky, Lakewood, OH (US); David Noonan, Webster Groves, MO (US); Gustavo Arnaldo Narvaez, Solon, OH (US); Brian Asquith, Cleveland Heights, OH (US)

( * ) Notice: Subject to any disclaimer, the term of this patent is extended or adjusted under 35 U.S.C. 154(b) by 303 days.

(21) Appl. No.: 12/624,371

(22) Filed: Nov. 23, 2009

(65) Prior Publication Data

US 2010/0131308 A1    May 27, 2010

Related U.S. Application Data

(60) Provisional application No. 61/118,400, filed on Nov. 26, 2008.

(51) Int. Cl.
*G06Q 90/00* (2006.01)
(52) U.S. Cl. ............... 705/14.49; 705/4; 705/14.4
(58) Field of Classification Search ............ 705/4, 14.49
See application file for complete search history.

(56) References Cited

U.S. PATENT DOCUMENTS

| | | | |
|---|---|---|---|
| 5,548,273 A | 8/1996 | Nicol et al. | |
| 5,797,134 A | 8/1998 | McMillan et al. | |
| 5,852,811 A | 12/1998 | Atkins | |
| 6,064,970 A | 5/2000 | McMillan et al. | |
| 6,456,982 B1 | 9/2002 | Pilipovic | |
| 6,502,020 B2 | 12/2002 | Lang | |
| 6,594,635 B1 | 7/2003 | Erlanger | |
| 6,615,187 B1 | 9/2003 | Ashenmil et al. | |
| 6,868,386 B1 | 3/2005 | Henderson et al. | |
| 7,010,289 B2 | 3/2006 | Jijina et al. | |
| 7,395,219 B2 | 7/2008 | Strech | |

(Continued)

FOREIGN PATENT DOCUMENTS

JP     2002318844     10/2002

OTHER PUBLICATIONS

OA dated Aug. 18, 2011 for U.S. Appl. No. 12/498,446, 55 pages.

(Continued)

*Primary Examiner* — James Vezeris
(74) *Attorney, Agent, or Firm* — Turocy & Watson, LLP

(57) ABSTRACT

System(s) and method(s) to incentivize adoption of time-dependent customized insurance benefit(s) are provided. A provider of insurance benefit(s) incentivizes adoption of the insurance benefit(s) in exchange for knowledge of operation characteristics of an insured entity. Knowledge is cumulative and collected from the insured entity and environment in which the entity operates. Incentivation is accomplished at least in part through generation of incentive offer(s) based on available knowledge, which is associated with an operator of the insured entity rather than with the entity itself. The operator can regulate the scope of exchanged knowledge, and received incentive offer(s) and related content. Incentive offer(s) can be directed to provision of insurance benefit coverage that is adequate to current or nearly current operation condition(s); discounted real-time or nearly real-time insurance benefits; or subsidized service(s). Offered incentives can be afforded at least in part through monetization of available knowledge via commercialization thereof or targeted advertisement.

20 Claims, 12 Drawing Sheets

U.S. PATENT DOCUMENTS

| | | | |
|---|---|---|---|
| 7,469,215 B2 | 12/2008 | Kwan | |
| 7,567,914 B2 | 7/2009 | Bonissone et al. | |
| 7,698,158 B1 | 4/2010 | Flagg | |
| 7,734,525 B2 | 6/2010 | Zborovskiy et al. | |
| 7,827,046 B2 | 11/2010 | Conner et al. | |
| 7,865,378 B2 | 1/2011 | Gay | |
| 7,937,278 B1 | 5/2011 | Cripe et al. | |
| 8,024,112 B2* | 9/2011 | Krumm et al. | 701/423 |
| 2002/0026334 A1 | 2/2002 | Igoe | |
| 2002/0046207 A1 | 4/2002 | Chino et al. | |
| 2002/0065687 A1 | 5/2002 | Onoue | |
| 2002/0069157 A1 | 6/2002 | Jordan | |
| 2002/0116228 A1 | 8/2002 | Bauer et al. | |
| 2003/0093304 A1 | 5/2003 | Keller et al. | |
| 2003/0177140 A1 | 9/2003 | Debard et al. | |
| 2003/0224854 A1 | 12/2003 | Joao | |
| 2004/0039609 A1 | 2/2004 | Burkitt | |
| 2004/0143378 A1* | 7/2004 | Vogelsang | 701/35 |
| 2004/0153362 A1 | 8/2004 | Bauer et al. | |
| 2004/0160327 A1 | 8/2004 | Kusano | |
| 2005/0049765 A1 | 3/2005 | Chetia et al. | |
| 2005/0071202 A1 | 3/2005 | Kendrick | |
| 2005/0099279 A1 | 5/2005 | Forbes et al. | |
| 2005/0156726 A1 | 7/2005 | Rubel | |
| 2006/0053038 A1 | 3/2006 | Warren et al. | |
| 2006/0074724 A1 | 4/2006 | Schwartz et al. | |
| 2006/0229940 A1 | 10/2006 | Grossman | |
| 2007/0027726 A1 | 2/2007 | Warren et al. | |
| 2007/0050248 A1* | 3/2007 | Huang et al. | 705/14 |
| 2007/0208751 A1 | 9/2007 | Cowan | |
| 2007/0257804 A1 | 11/2007 | Gunderson et al. | |
| 2008/0077451 A1 | 3/2008 | Anthony et al. | |
| 2008/0126138 A1 | 5/2008 | Cherney et al. | |
| 2008/0228605 A1 | 9/2008 | Wang | |
| 2008/0243558 A1 | 10/2008 | Gupte | |
| 2008/0319602 A1 | 12/2008 | McClellan et al. | |
| 2009/0024273 A1* | 1/2009 | Follmer et al. | 701/35 |
| 2009/0024419 A1 | 1/2009 | McClellan et al. | |
| 2009/0024420 A1 | 1/2009 | Winkler | |
| 2009/0030853 A1 | 1/2009 | De La Motte | |
| 2009/0037230 A1 | 2/2009 | Tracy et al. | |
| 2009/0063201 A1 | 3/2009 | Nowotarski et al. | |
| 2010/0057556 A1 | 3/2010 | Rousso | |
| 2010/0094482 A1 | 4/2010 | Schofield | |
| 2010/0100485 A1 | 4/2010 | Haddy | |
| 2010/0153137 A1 | 6/2010 | Rao et al. | |
| 2011/0022417 A1 | 1/2011 | Rao | |
| 2011/0106370 A1 | 5/2011 | Duddle et al. | |

OTHER PUBLICATIONS

OA dated Oct. 13, 2011 for U.S. Appl. No. 12/547,800, 22 pages.

OA dated Oct. 28, 2011 for U.S. Appl. No. 12/624,366, 25 pages.

OA dated Nov. 10, 2011 for U.S. Appl. No. 12/612,958, 28 pages.

Ho, et al. "Integrating Intelligent Driver Warning Systems: Effects of Multiple Alarms and Distraction on Driver Performance". Transportation Research Board 85th Annual Meeting Compendium CD-ROM, Washington, D.C., 2006, 16 pages.

Gregory Seay, CT firm seeks to market safe-driving. http://www.hartfordbusiness.com/news8988.html. Last accessed May 20, 2009, 1 page.

International Search Report and Written Opinion dated Mar. 19, 2010 for PCT Application Serial No. PCT/US2009/065730, 13 pages.

OA dated Jul. 11, 2011 for U.S. Appl. No. 12/490,033, 50 pages.

Ho, et al., Integrating Intelligent Driver Warning Systems: Effects of Multiple Alarms and Distraction on Driver Performances, TRB 2006 Annual Meeting, Submitted on Jul. 31, 2005 and Revised on Nov. 15, 2005 (pp. 1-16).

OA dated Jun. 28, 2011 for U.S. Appl. No. 12/536,999, 25 pages.

OA dated Jul. 22, 2011 for U.S. Appl. No. 12/395,342, 65 pages.

OA dated Jan. 31, 2012 for U.S. Appl. No. 12/490,033, 65 pages.

OA dated Jan. 31, 2012 for U.S. Appl. No. 12/536,999, 25 pages.

OA dated Feb. 23, 2012 for U.S. Appl. No. 12/395,342, 30 pages.

OA dated Apr. 30, 2012 for U.S. Appl. No. 12/612,958, 32 pages.

OA dated Mar. 19, 2012 for U.S. Appl. No. 12/498,446, 59 pages.

OA dated Apr. 12, 2012 for U.S. Appl. No. 12/624,366, 31 pages.

* cited by examiner

INCENTIVIZED ADOPTION OF TIME-DEPENDENT INSURANCE BENEFITS

CROSS-REFERENCE TO RELATED APPLICATIONS

This application claims priority to U.S. Provisional Application Ser. No. 61/118,400, filed on Nov. 26, 2008, and entitled "INSURANCE OPTIMIZER AND REAL TIME ANALYTICS." This application is also related to U.S. patent application Ser. No. 12/624,366 entitled "MONETIZATION OF PERFORMANCE INFORMATION OF AN INSURED VEHICLE," and filed on Nov. 23, 2009. The entireties of the above-captioned applications are incorporated herein by reference.

TECHNICAL FIELD

The subject disclosure relates generally to insurance benefits and optimization thereof and, more specifically, to promoting adoption of time-dependent customized insurance benefit(s).

BACKGROUND

Insurance benefit(s), or coverage, typically refers to a contract, wherein an insurance carrier agrees to pay for insured financial losses resulting from a specified event. Such insurance benefit(s) is a commodity that many people purchase for peace of mind or because local laws require such coverage. Thus, most people might consider insurance as something that is necessary and, at times, undesirable due to insurance premiums.

Rates of insurance benefit(s), such as car insurance rates, are typically determined based on desired benefit(s) and various factors related to the prospective beneficiary that are mostly historical and rather limited. In general, the insurance company determines insurance costs based on insurance models that classify segments of the population in groups sharing similar data, such as data on features of beneficiary (e.g., health condition(s)) or property intended to be insured (car make and model, car color, car features, whether the car is garaged, estimated miles to/from the office, etc.); demographic data (e.g., age group, sex, marital status, educational background, ethnicity); historical data related to intended insurance benefit, which can include driving history as recorded primarily based on an event basis (accident(s), ticket(s) for traffic violation, processed claim(s), etc.); environmental factors related to where the prospective beneficiary lives, which is commonly factored in through ZIP code and available information thereof, recorded appraised value of property, crime rate in the area; and so forth. Members of a segment are not distinguished for assessment of insurability and related cost. While such approach has the advantage of simplicity, it fails to incorporate variance(s) that exist amongst members in same segment, and hence squanders valuable data related to each individual's unique traits that can further affect respective insurance benefit(s) rates. More importantly, in some cases, the segments upon which rates are determined do not adequately represent a prospective beneficiary's potential coverage liability. As an example, with respect to motor vehicle insurance and for a specific segment, a first operator of a car may commute to work using inner-city streets while a second operator of a second car can commute through a highway.

In addition, many insurance consumers do not associate any loyalty with a particular insurance carrier, particularly those such as motor vehicle insurers, which commercialize highly commoditized insurance benefits. Thus, to find better coverage, lower rates, or both, a large number of insurance consumers frequently evaluate alternative providers of insurance benefit(s) with respect to the provider currently supplying the insurance benefit(s). As a result, insurance providers, or insurance carriers, aggressively pursue service and benefit(s) differentiation, regardless how marginal, in order to mitigate prevalent consumer attrition.

Moreover, most insurance benefit(s), such as motor vehicle insurance coverage, provided by conventional insurance carriers is typically rigidly priced and billed in relatively long time scales, e.g., in monthly or semi-annually periods. Rates occasionally fluctuate, but commonly, fluctuations only occur at the end of such relatively long time scales and can be based on additional factors unrelated directly to features or characteristics of the beneficiary, e.g., an automobile owner. Accordingly, adjustment to insurance benefit(s) and pricing thereof can significantly fail to timely accommodate changes to beneficiary's needs or be supplied at a fair price-point.

SUMMARY

The following presents a simplified summary in order to provide a basic understanding of some aspects of the disclosed examples. This summary is not an extensive overview and is intended to neither identify key or critical elements nor delineate the scope of such aspects. Its purpose is to present some concepts in a simplified form as a prelude to the more detailed description that is presented later.

In accordance with one or more examples and corresponding disclosure thereof, various aspects are described in connection with optimizing insurance from the perspective of both the insurance provider and the insurance purchaser. According to an aspect, real time analytics is utilized to selectively adjust insurance premiums, coverage, and other parameters.

One or more embodiments provide system(s) and method(s) to incentivize adoption of time-dependent customized insurance benefit(s). A provider of insurance benefit(s) incentivizes adoption of the insurance benefit(s) in exchange for knowledge of operation characteristics of an insured entity. Incentivation is accomplished at least in part through generation of incentive offer(s) based on available knowledge. Knowledge is associated with an operator of the insured entity rather than with such entity, and the operator can regulate the scope of exchanged knowledge, and received incentive offer(s) and related content. Knowledge is cumulative and collected from insured entity and environment in which the entity operates. Incentive offer(s) can be directed to provision of insurance benefit coverage that is adequate to current or nearly-current operation condition(s); discounted real-time or nearly real-time insurance benefits; or subsidized service(s). Offered incentives can be afforded at least in part through monetization of available knowledge via commercialization thereof or targeted advertisement.

In addition, the one or more embodiments or additional or alternative embodiment(s) provide system(s) and method(s) to monetize knowledge of operation characteristics of an insured entity are provided. The provider of insurance benefit(s) supplies knowledge of operation characteristics of an insured entity in exchange for a financial compensation. Financial compensation also can be received through commercialization of resources to expose an agent (e.g., an operator, an occupant, a resident, etc.) linked to the insured entity to advertisement in addition to delivery of the knowledge of operation characteristics of the insured entity. The provider of insurance benefit(s) can exploit the financial compensation to afford, at least in part, incentives directed to discounted insurance benefit(s) or subsidized service(s).

While various aspects, features, or advantages of the subject innovation are illustrated with insurance of a motor vehicle, such as an automobile, a motor boat, an airplane, a motorcycle, or the like, and real-time or nearly real-time coverage, it should be appreciated that disclosed aspects, features, or advantages are not so limited and can be exploited in provision of most any or any insurance benefit(s). As an example, insurance benefit(s) can include health insurance coverage, in which case performance information comprises vitals, biometrics, or other physiological data or metrics of an individual as well as data on environment in which the individual lives or works. As another example, the insurance benefit(s) can encompass home insurance coverage, wherein performance information can include data on whether the house doors are locked when no one is present, or property vandalism events affect location of insured house, etc.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the various aspects may be employed. Other advantages and novel features will become apparent from the following detailed description when considered in conjunction with the drawings and the disclosed examples are intended to include all such aspects and their equivalents.

DETAILED DESCRIPTION

Figure 1:
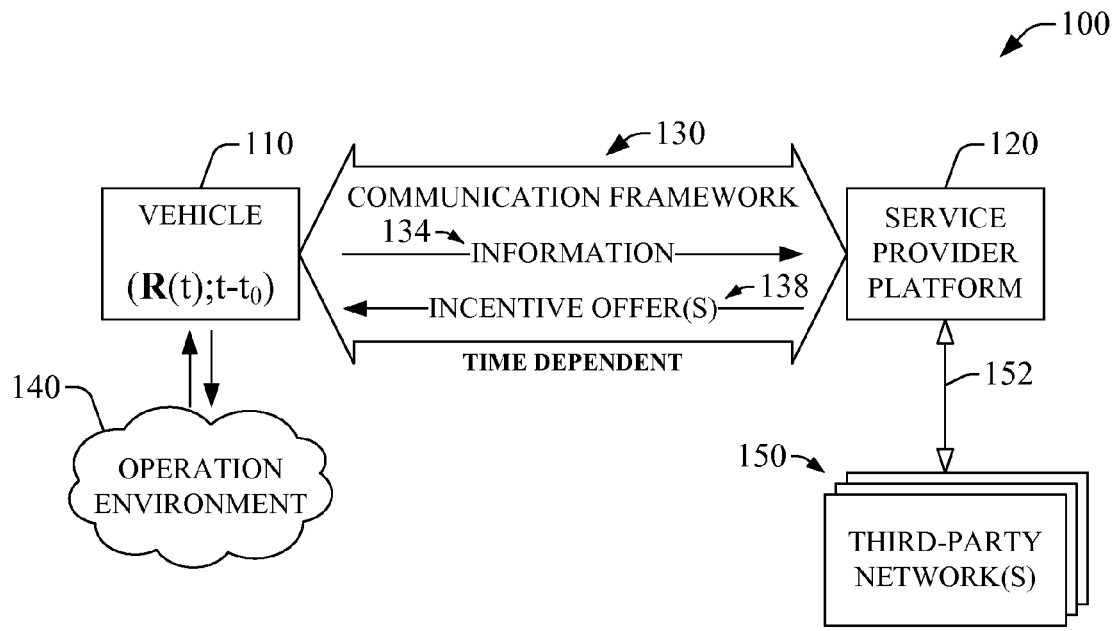
FIG. 1 is a high-level representation of a system that promotes adoption of real-time or nearly real-time benefit(s) in accordance with aspects of the subject disclosure.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

As used in this application, the terms "component", "module", "system", "platform," "interface," and the like are intended to refer to a computer-related entity or an entity related to an operational apparatus with one or more specific functionalities, wherein the computer-related entity and the entity related to the operational apparatus can be either hardware, a combination of hardware and software, software, or software in execution. One or more of such entities are also referred to as "functional elements." As an example, a component may be, but is not limited to being, a process running on a processor, a processor, an object, an executable, a thread of execution, a program, and/or a computer. By way of illustration, both an application running on a server or network controller, and the server or network controller can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software, or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, module, interface, and the like.

Artificial intelligence based systems (e.g., explicitly and/or implicitly trained classifiers) can be employed in connection with performing inference and/or probabilistic determinations and/or statistical-based determinations as in accordance with one or more aspects as described hereinafter. As used herein, the term "inference" refers generally to the process of reasoning about or inferring states of the system, environment, and/or user from a set of observations as captured through events, sensors, and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the disclosed aspects.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Additionally, in the subject disclosure, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Further, the term "set" as employed herein excludes the empty set. Thus, a "set" in the subject disclosure includes one or more elements or entities. As an illustration, a set of offers includes one or more offers, or a set of devices includes K devices with K a natural number greater than or equal to unity.

As described in greater detail below, the subject disclosure provides system(s) and method(s) to incentivize adoption of real-time or nearly real-time customized insurance benefit(s). A provider of insurance benefit(s) incentivizes adoption of the insurance benefit(s) in exchange for knowledge of, or information on, operation characteristics of an insured entity. Knowledge is cumulative and can be collected from the insured entity or an environment in which the entity operates; performance collection components can probe operation conditions and environment of the insured entity. Incentivation can be accomplished at least in part through generation of incentive offer(s) based on available knowledge and exposure of such offer(s) to an operator of the insured entity. Knowledge is associated, e.g., in a one-to-one relationship, with the operator of the insured entity rather than with the entity itself; accordingly, incentive offer(s) can be customized for the operator irrespective of details (e.g., vehicle make or model) of the insured entity. The operator can regulate the volume and detail of knowledge, or information, exchanged with the provider of insurance benefit(s); likewise, the operator can specify the scope, e.g., type and desired features, of received incentive offer(s) and related content, such as advertisement. Incentive offer(s) can be directed to provision of insurance benefit coverage that is adequate to current or nearly current operation condition(s); discounted real-time or nearly real-time insurance benefits; or (iii) subsidized service(s).

In addition the subject disclosure provides system(s) and method(s) to monetize knowledge of operation characteristics of an insured entity are provided. The provider of insurance benefit(s) supplies knowledge of operation characteristics of an insured entity in exchange for a financial compensation. Financial compensation also can be received through commercialization of resources to expose an agent (e.g., an operator, an occupant, a resident, etc.) linked to the insured entity to advertisement in addition to delivery of the knowledge of operation characteristics of the insured entity. The provider of insurance benefit(s) can exploit the financial compensation to afford, at least in part, incentives directed to discounted insurance benefit(s) or subsidized service(s).

In aspects described herein, operational performance of a vehicle utilized as part of time-dependent insurance benefit(s) not only can reward a safe operator with discounted insurance benefit(s) rates, but it can incentivize the safe operator to maintain a time-dependent insurance benefit policy. Operational performance as exploited herein provides real-time or nearly real-time data on performance, or operation, of a vehicle and the environment on which the vehicle performs, and can be utilized in conjunction with other information to evaluate driving behavior and assess, in real-time or nearly real-time, insurance benefit(s) costs and establish incentives related to such insurance benefit(s).

Referring to the drawings, FIG. 1 is a high-level representation of a system 100 that promotes adoption of real-time or nearly real-time insurance benefit(s) in accordance with aspects of the subject disclosure. As indicated supra, the real-time or nearly real-time insurance benefit(s) includes insurance for vehicle 110; however, the real-time benefit(s) can include other benefits, such as health insurance, life insurance, or the like, related to operator(s) or occupant(s) of vehicle 110. Such real-time or nearly real-time insurance benefit(s) are provided (e.g., offered, marketed, issued, administered, or effected) by service provider platform 120.

To promote adoption of real-time or nearly real-time insurance benefit(s), vehicle 110 or a device linked thereto supplies service provider platform 120 with information 134 on performance, or operation, of vehicle 110 and, in response, incentive offer(s) 138 is received. Information 134 and incentive offer(s) 138 can be exchanged through a communication framework 130, which can include various communication networks, mobile and non-mobile, and associated functional elements (e.g., component(s), server(s), access point(s) . . . ) that enable communication; communication networks can include personal network(s) (e.g., point-to-point short-range telecommunication network based on, for example, wearable devices); local area network(s); or wide area network(s). Service provider platform 120 or related third-party network(s) 150 can issue incentive offer(s) 138 based at least in part on available information, which can be current or nearly current information or historical information. Service network platform 120 is functionally connected to third-party network(s) 150 via interface 152, which can include I/O interface components (e.g., modem(s), gateway(s), router(s), server(s) . . . ), wired or wireless links, or the like.

Information 134 can correspond to performance information of vehicle 110 at an instantaneous position R(t), which is a time-dependent position vector and indicates a trajectory of vehicle 110, and after a period of operation $\Delta t = t - t_0$, with t a current or substantially current instant and $t_0$ a time at which vehicle operation started. In addition, information 134 can include cumulative performance data, or historical performance data. Performance data can be collected by vehicle 110, or a device functionally coupled thereto, and can include data intrinsic to vehicle 110 or data extrinsic to vehicle 110. Intrinsic data can comprise location (e.g., latitude, longitude, altitude), velocity, acceleration or deceleration (e.g., driven by actuation of brake(s) of vehicle 110), or operational condition(s) (e.g., mileage, maintenance and repair records) of vehicle 110. In the alternative, extrinsic data includes data on operator or occupant(s) of vehicle 110, or data on operation environment 140. As an example, the operation environment 140 can be a highway in which vehicle 110 travels and the extrinsic data can include position of surrounding (in-road or off-road) vehicles relative to vehicle 110; velocity or acceleration of surrounding vehicles; traffic data (average velocity of a group of cars, presence of accident(s), etc.) at nearby location(s) that is part of a planned trajectory of vehicle 110; identified road hazards; intended destination or departure location ($R(t_0)$); or the like. As another example, operation environment 140 can include location(s) in which vehicle 110 operates (e.g., high or low accident area, high car damage or theft area, safe garage parking area . . . ). Moreover, with respect to operator of vehicle 110, extrinsic data can include biometrics information or vitals data of such operator, e.g., heart rate, blood pressure, blood glucose, perspiration level, etc., which can affect performance of vehicle 110. For example, when vehicle 110 is a car, irregular heartbeat and high blood pressure can suggest the driver of vehicle 110 is highly stressed and thus prone to unsafe driving conduct, which may warrant increase insurance benefit(s) rate. For another example, an operator with dangerously low blood glucose can be likely to cause an accident in view of risk of loosing consciousness due to inadequate blood sugar level; thus, an increase in insurance benefits(s) may be warranted.

It can be appreciated that information 134 conveys rich, highly segmented contextual data (e.g., data on several facets of operation of vehicle 110, or operator or occupant(s) thereof) that service provider platform 120 or related third-party network(s) 150 can exploit to generate incentive offer(s) 138. Thus, in contrast to conventional incentivation systems, incentive offer(s) 138 described herein are highly customized, beneficiary-centric offer(s). In addition, incentive offer(s) 138 can be adjusted in real-time or nearly real-time in response to time-dependent variations in information 134. Furthermore, in view that incentive offer(s) 138 are exchanged for information 134, such incentive offer(s) can provide value to both service provider platform and prospective beneficiary of retained insurance benefits.

In an aspect of the subject disclosure, incentive offer(s) 138 can be directed to provision of (i) insurance benefit(s), or coverage, that is adequate to current or nearly-current operation condition(s) of vehicle 110, in addition to specific incentive package(s); (ii) discounted real-time or nearly real-time insurance benefit(s) for vehicle 110; (iii) subsidized service(s) that operator of vehicle 110 or occupant(s) thereof can consume; or (iv) enhanced incentive package(s), particularly in scenarios in which service provider platform 120 increases price-point, or rate, of insurance benefit(s) in view of received information 134. In connection with (i), if operator of vehicle 110 adopts real-time or nearly real-time insurance benefit(s), the operator not only benefits from received specific incentive package(s) (e.g., coupons for merchandise related to trajectory of vehicle 110), but in view of pattern(s) of operation of vehicle 110 as revealed by information 134, the operator also mitigates risk of underinsured operation of vehicle 110 or unnecessary acquisition of insurance benefit(s) (e.g., excessive comprehensive coverage). Thus, incentive offer(s) 138 directed primarily to provision of adequate coverage can increase customer loyalty through generation of highly customized, dynamic insurance benefit(s).

With respect to (ii), service provider platform 120 or one or more of third-party network(s) 150 can subsidize discounts for insurance benefit(s) that operator of vehicle 110 can acquire. Magnitude of discounts can be assessed based at least in part on at least one of volume and detail of information 134 that is communicated to service provider platform 120; scope of incentive offer(s) 138 allowed to be received; or scope of recipients of information 134. In an aspect, higher detail, or granularity, and/or higher scope can result in higher discounts. In the alternative or in addition, higher granularity can result in "forgiveness" of specific information within information 134 that can be typically adverse to beneficiary, e.g., operator of vehicle 110, and can result in increase of rate of insurance benefit(s); for instance, an operator that discloses received tickets for traffic violation(s), e.g., camera-captured speeding infraction, can avoid increase in insurance benefit rate if the unlawful speed was within a predetermined threshold (e.g., 2-4 miles per hour) of a speed limit in the area in which the camera captured the traffic violation. Such threshold or other forgiveness criteria can be established by service provider platform 120, e.g., insurance company, based on normal or expected conduct of operation of vehicle 110.

In another aspect, with respect to incentive offer(s) 138 allowed to be received, discounts for insurance benefit(s) can be determined by type and volume of advertisement that operator of vehicle 110 agrees to receive from service provider platform 120 or third-party network(s) 150. In such an aspect, service provider platform 120 can subsidize insurance benefit(s) through revenue originated from sale or lease of resources (e.g., radio channel(s) or radio time slot(s), display real estate in navigation device) for advertisement within vehicle 110. Specific departments of service provider platform 120, retailers, third-party network(s) can purchase or lease such advertisement resources. In addition or as an alternative, discounted price-point for insurance benefit(s) can be achieved if operator of vehicle 110 accepts an incentive offer to receive customized, or contextual, promotional content from the service provider platform 120 or specific advertiser(s). Such promotional content can be customized based at least in part on a portion of information 134 that is made available to the service provider platform 120 or the specific advertiser. Based on the portion of information 134, customization can be accomplished as a function of at least one of time, location, or event(s). As an example, the portion of information 134 that is made available can include typical mobility trajectories of vehicle 110; such information can be provided to retailers (restaurants, bookstores, coffee shops, etc.) located in the vicinity of the mobility trajectories, e.g., a route of vehicle 110 from a starting point to a destination, a retailer within such retailers can deliver advertisement(s) or incentives, e.g., coupons, at times in which vehicle 110 is in proximity of the retailer location. As another example, if the portion of information 134 that is supplied includes common destinations, e.g., historically re-incident locations, of vehicle 110, retailers can advertise specific merchandise related to the destination. In particular, if the common destinations are, for example, a childcare facility, a coffee shop, and a health club, retailers that sale diapers, baby formula, children clothing; custom coffee blends and espresso machines; and nutrition supplements can supply advertisement to vehicle 110 or related operator. As yet another example, if the available portion of information 134 includes specific mechanical condition(s) of vehicle 110 and position, coupon(s) and contact information (e.g., telephone number, email address, website address) of a nearby repair shop and towing service can be delivered to vehicle 110 in an emergency event. It should be appreciated that as the portion of information 134 that is allowed to be made available to advertiser(s) becomes more comprehensive, such information allows improved customization or targeting of advertisement content(s) and thus discount in price-point of insurance benefit(s) can become substantial (e.g., 50% discount over regularly quoted price-point) as the advertiser(s) can pay premium fees for advertisement opportunities.

In yet another aspect, operator (e.g., driver) or vehicle 110 can elect to allow or block specific information from service provider platform 120 (e.g., insurance company) or other entities such as law enforcement agencies (e.g., third-party network(s) 150). Based on such election, scope of information 134 can be determined, and service provider (e.g., insurance company) can provide lower or higher rate(s) for insurance benefit(s); in one example, allowing broad information to be conveyed as part of information 134 may result in lower rates.

With respect to (iii), if an operator of vehicle 110 allows exposure of information 134 that allows rich context identification, e.g., extraction of patterns of mobility and operation habits related to vehicle 110, an advertiser or service provider exposed to such information can subsidize one or more services for the operator. The service can include wireless service, such as voice, data, or voice and data; road assistance; medical or dental services, e.g., if the dentist office is in proximity of workplace of operator, dentist can provide discounted service; salon or barber service; etc.

Regarding (iv), as indicated supra, in scenarios in which granularity or scope of information can adversely affect assessed rate for insurance benefit(s), service provider platform 120 can promote adoption of real-time or nearly real-time insurance benefit(s) through enhanced incentive package(s), such as discounted operation (e.g., driving) educational material(s) or operation lesson(s). It should be appreciated that access to such material can benefit both operator of vehicle 110 and service provider platform 120 (e.g., insurance company), since safer operation of vehicle 110 reduces risk of operator pursuing a claim as a result of accident, which reduces expenses for service provider platform 120, and operator of vehicle 110 improves performance and thus can reduce rate of insurance benefit(s) over time.

Figure 2:
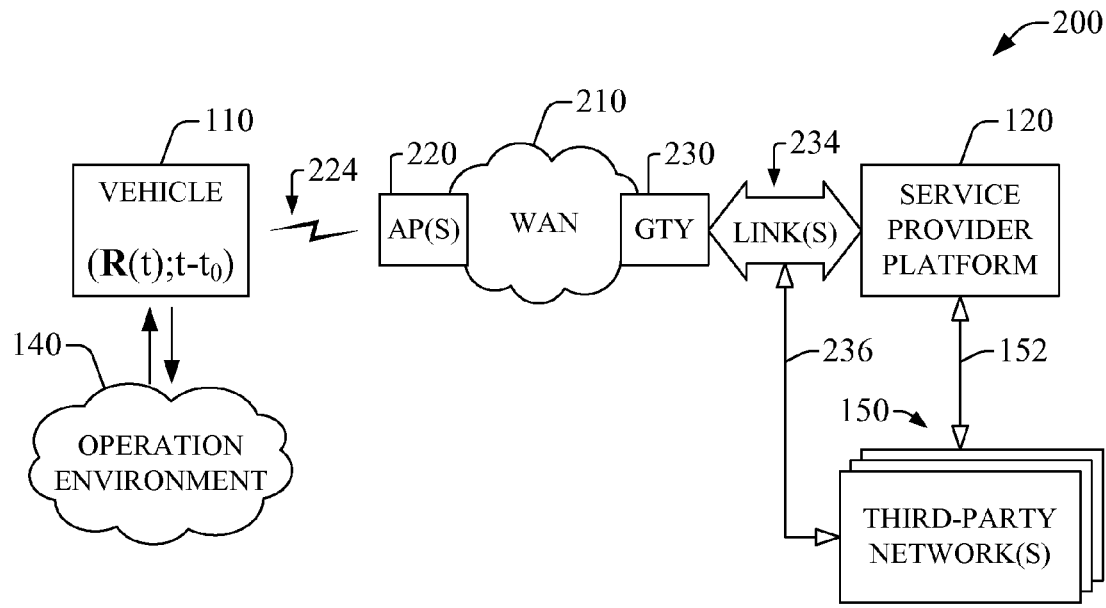
FIG. 2 illustrates an example embodiment of a communication framework that is part of an example system as conveyed in FIG. 1 in accordance with aspects described herein.

FIG. 2 illustrates an example embodiment of a communication framework that is part of an example system 200 to promote adoption of real-time or nearly real-time insurance benefit(s) in accordance with aspects of the subject disclosure. The illustrated communication framework can embody communication framework 130. Vehicle 110 communicates with service network 120 through wide area network (WAN) 210, which can include wireless and wireline functional elements that enable communication throughout various geographical areas. Operation environment 140 can be part of deployment region(s) of WAN 210, even though it is illustrated as a separate entity. An insurance benefit carrier, or insurance company, that administers service provider platform 120 need not own WAN 210 in order to accomplish communication with vehicle 110 or device(s) linked thereto.

In an aspect, vehicle 110 can deliver traffic, or user data, and control data, or signaling, to access point(s) (AP(s)) 220 via wireless link 224; likewise, vehicle 110 can receive traffic and signaling from AP(s) 220 via wireless link 224. In view of mobility (e.g., trajectory R(t)) of vehicle 110, as time progresses, different access point(s) in AP(s) 220 can serve traffic and signaling to vehicle 110. Signaling and traffic can be delivered or received in accordance with one or more radio technology protocols, such as Third Generation Partnership Project (3GPP) Long Term Evolution (LTE), 3GPP Universal Mobile Telecommunication System (UMTS), 3GPPP High Speed Packet Access (HSPA), or fourth generation (4G) radio technologies such as LTE Advanced (LTE-A). A network interface (not shown) with wireless functionality and related circuitry, e.g., antenna(s), modem, codec(s), etc., in vehicle 110 can enable such exchange of traffic and signal amongst vehicle 110 and AP(s) 220. Traffic and signaling received in AP(s) 220 can be relayed to one or more network management component(s) (e.g., radio network controller (RNC), mobility management entity (MME), network gateway(s) . . . ) within WAN 210, which can deliver at least a portion of the traffic and signaling to a gateway (GTY) 230, which functionally connects WAN 210 to service network 120 via link(s) 234. Link(s) 234 can include wired link(s), e.g., reference link(s), or wireless or wired backhaul pipe(s). As described supra, service network platform 120 is functionally connected to third-party network(s) 150 via interface 152. Service network platform 120 or third-party network(s) 150 can deliver traffic and signaling to vehicle 110 through the functional element(s) described supra. Third-party network(s) 150 can route traffic or signaling through service provider platform 120 or direct connectivity to link(s) 234, via interface 236 (wired or wireless link(s), reference link(s), router(s), gateway(s), etc.).

Figure 3:
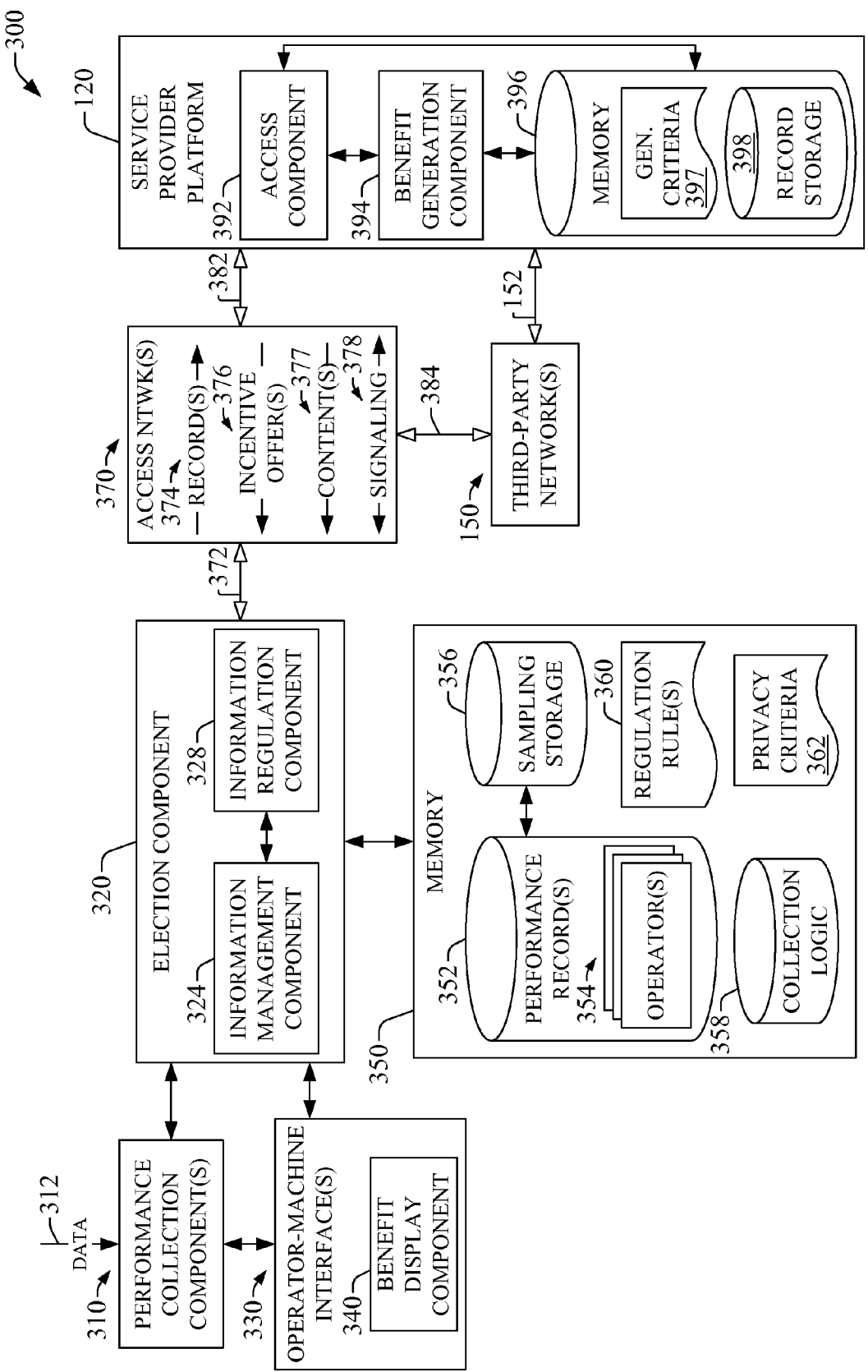
FIG. 3 displays a block diagram of an example system that enables incentivation of adoption of real-time or nearly real-time insurance benefits in accordance with aspects described herein.
Figure 4:
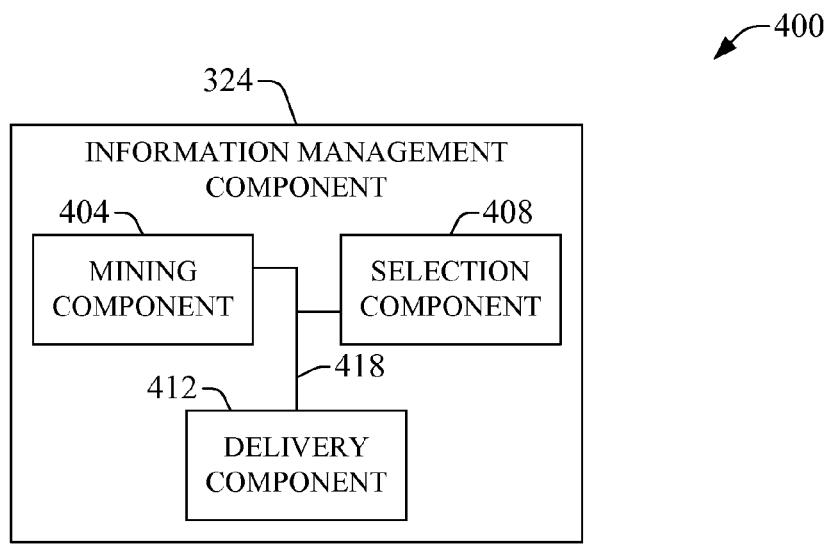
FIG. 4 presents an example embodiment of a component that manages data on operation of a vehicle in accordance with aspects described herein.
Figure 5:
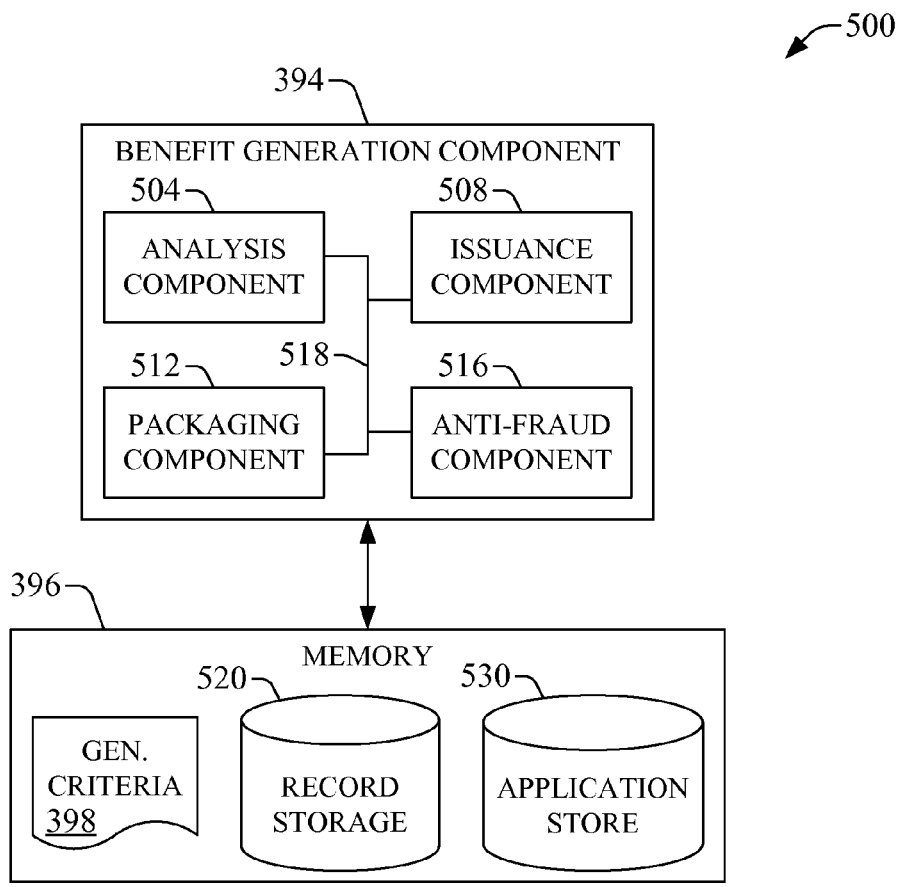
FIG. 5 illustrates an example embodiment of a component that generates insurance benefit(s) and related incentive offer(s) in accordance with aspects of the subject disclosure.

FIG. 3 displays a block diagram of an example system 300 that enables incentivation of adoption of real-time or nearly real-time insurance benefit(s) in accordance with aspects described herein. Throughout description of example system 300, FIGS. 4-5 are referenced to illustrate various features or aspects of example system 300 or specific component(s) therein. As discussed supra, intrinsic data and extrinsic data on performance, or operation, of a vehicle, e.g., 110, compose performance information, e.g., 134, that is utilized to produce incentive offer(s), e.g., 138, to adopt real-time or nearly real-time insurance benefit(s). The performance information can characterize operational behavior of vehicle 110. In example system 300, one or more performance metric collection component(s) 310, also referred to as performance collection component(s) 310, can probe various sources of performance operation condition(s) of a vehicle (e.g., 110) or features(s) of an operation environment (e.g., 140) of the vehicle in order to gather at least one of intrinsic data or extrinsic data, indicated with data 312.

Performance collection component(s) 310 can be integrated with the vehicle (e.g., 110) for which performance operation information, or knowledge, is collected. For example, performance collection component(s) 310 can be embodied in a computerized monitoring box integrated with the vehicle and that probes mechanical condition(s) thereof (tire pressure, oil or fuel level, battery charge, fluid(s) temperature, payload weight, etc.) or operation parameters such as velocity, and acceleration or deceleration of the vehicle. For another example, an integrated navigation system (e.g., a satellite-based navigation unit and associated electronic circuitry) or integrated cameras (e.g., for vehicle assisted maneuvering) also can provide at least a portion of performance operation information. For yet another example, at least one or more performance collection component(s) 310 can be embodied as sensors integrated in the steering wheel or other control device (e.g., a joystick in an aircraft) of vehicle 110. Such sensors can efficiently allow collection of biological or medical data of operator of vehicle 110 without reliance on, for example, wearable devices, which may not be readily adopted by older drivers or operators.

Additionally or alternatively, performance collection component(s) 310 can be part of an add-on device, and associated circuitry, operationally coupled, e.g., attached through a functionally active wired or wireless link and suitable interface(s), to the vehicle. As an example, one or more of performance collection component(s) 310 can be embodied in a mobile station (smartphone, wireless enable personal computer), which can supply at least one of location data or trajectory data such as velocity and acceleration or deceleration. In an aspect, such data can be collected through a global navigation satellite system (Global Positioning System (GPS), Galileo, etc.) transceiver and processor that operates in the mobile station. As another example, data can be collected through an add-on navigation device, and associated circuitry.

One or more components in performance collection component(s) 310 can enable identification of an operator of a vehicle. For example, a biometric reader (an iris scan, fingerprint reader, etc.) can identify the operator and associate, in a one-to-one relationship, collected data on performance, or operation, of the vehicle with the operator. As another example, if one of collection component(s) 310 is embodied in a mobile handset, a vehicle that includes wireless communication functionality (e.g., point-to-point short-range wireless access point(s), or other types of vehicular access point(s)) can identify the operator of the vehicle or other occupant(s) after the mobile handset attaches to an access point deployed in the vehicle. Accordingly, collected performance data can be independent of operated vehicle.

Performance data also can associated with an operator in vehicles that lack biometric readers or limited wireless functionality. In a scenario, a device, and associated circuitry, that can identify the operator can be carried by the operator. For example, a radiofrequency (RF) transceiver device attached to a keyfob can be actuated by an RF scanner affixed to the vehicle and thus provide identification for the operator. For another example, a tag with a barcode associated with the vehicle or one or more performance collection component(s) can be scanned prior to operation of vehicle. Other identification means are also possible.

In addition or in the alternative to features or aspects of performance collection component(s) 310, in one or more embodiments, performance collection component(s) 310 can generally include at least one of a processor, a memory, one or more components, or circuitry for communication amongst the one or more components, the processor, and the memory, in order to implement collection of performance data. For specific embodiments, the one or more components that can be part of performance collection component(s) 310 can be retained within the memory as set(s) of code instructions that are executed by the processor to enable at the very least collection and delivery of performance data as described herein. Execution of such code instructions also can enable exchange of at least performance data with other functional elements in example system 300.

In an aspect, intrinsic and extrinsic data on performance, or operation, can be conveyed to a set of operator-machine interface(s) 330, which can include conventional vehicular dashboard panels or advanced windshield display(s), and to an election component 320 that can administer or manipulate such data, and regulate access thereto in accordance with an election of incentive offer(s) 376. In another aspect, intrinsic or extrinsic data on performance, or operation, can be collected in accordance with collection logic 358, which can establish, at least in part, at least one of scope of collected data or data that is to be conveyed to operator-machine interface(s) 330 or election component 320.

Information management component 324 receives data on performance, or operation, and generates performance record(s), which can be at least one of (1) instantaneous record(s) that convey performance as probed at a current or nearly current instant, or (2) aggregated record(s) over a predetermined performance period. In an aspect, with respect to (1), instantaneous record(s) can replicate received data 312; e.g., instantaneous record(s) can comprise "raw" operation data. In another aspect, with respect to (1) and (2), information management component 324 can receive performance data in format(s) native to performance collection component(s) 310 and format generated performance record(s) in accordance to a protocol suitable for communication via access network 370. Generated performance record(s) can be specific to an operator of the vehicle for which the performance data is gathered; performance record(s) can be retained in memory 350 within memory element 352 classified according to operator, as illustrated by memory element(s) 354, which can comprise one or more databases. In one or more embodiments, such as embodiment 400 illustrated in FIG. 4, information management component 324 can include a mining component 404 that generates performance record(s) in accordance with (1) or (2). In an aspect, as part of aggregation of received performance data, mining component 404 can compute statistics (e.g., mean, standard deviation and other momenta, etc.), extract patterns; identify data clusters; extract correlations; etc.

In addition, information management component 324 can select a portion of performance record(s) 352, for a specific operator as recorded in memory element(s) 354, and deliver the selected portion to service provider platform 120 as operation information (e.g., 134). The selected portion of record(s) can be part of conveyed record(s) 374. In an aspect, selection of performance record(s) 352 can proceed in accordance with privacy criteria 362, which comprises a configurable set of rules that control volume and detail level (e.g., instantaneous record(s), aggregated record(s)) of performance information, e.g., record(s) 374, that is delivered to at least one of service provider platform 120 or third-party network(s) 150. The set of rules can be configured by the operator of a vehicle (e.g., 110) for which the data on performance is collected. In an embodiment, election component 320 (e.g., through information management component 324) in combination with operator-machine interface(s) 330 can enable configuration of privacy criteria 362, or associated set of rules. It is noted that while privacy criteria 362 is illustrated as separate from collection logic 358, such criteria can be retained within collection logic 358. As an illustration, in embodiment 400, selection component 408 enables configuration of privacy criteria. As illustrated in example embodiment 400, components that are part of information management component 324 can exchange information, e.g., data or signaling, via a bus 418 or any other information exchange conduit, protocol. Bus 418 can be embodied in at least one of a memory bus, a system bus, an address bus, or a message bus.

In response to supplied performance information, e.g., record(s) 374, service provider platform 120 can generate and deliver incentive offers(s) 376 to election component 320. In an aspect, access component 392 can receive the performance information, or information on operation, and retain such information in record storage 398; thus, the record storage 398 can include current or historical data on performance, or operation, of a vehicle or other insured entity associated with record(s) 374. In addition, access component 392 also can receive signaling 378. As described supra, service provider platform 120 (e.g., insurance carrier) can generate the incentive offer(s) 376 based at least in part on the received performance information; in an aspect, benefit generation component 394 can produce the incentive offer(s) 376. In one or more embodiments, for example, embodiment 500 illustrated in FIG. 5, benefit generation component 394 can include an analysis component 504 that can process received performance record(s) to issue an incentive offer; to at least that end, benefit generation component 394 can exploit a set of code instructions retained in application store 530. Exchange of information, e.g., data or signaling, amongst components that are part of benefit generation component 394 and amongst one or more of such components and memory 396 can be effected via a bus 518 or any other information exchange conduit, protocol. Bus 518 can be embodied in at least one of a memory bus, a system bus, an address bus, or a message bus.

In an aspect, analysis component 504 can correlate performance data with information available on the environment in which vehicle 110 operates. In an example, data on vehicle's velocity and location can be correlated, e.g., compared, with speed limits for a road currently traveled to determine if the vehicle is speeding and thus establish a current or nearly current insurance benefit rate or a discount thereof. In another example, analysis performance can contrast data on mechanical performance with standardized or expected parameters for various parts of the vehicle (in particular its make, model, etc.) to establish operational safety or assess risk of malfunction and thus determine a current or nearly current insurance benefit rate or discount thereof. In yet another example, analysis component 504 can retrieve information related to operational environment of vehicle 110 from one or more of third-party network(s) 150; for instance, analysis component 504 can retrieve statistics on accident occurrence or criminality indices along a current or selected route. In another aspect, analysis component 504 can aggregate received performance record(s), which can be retained in record storage 520, which is substantially the same memory element as record storage 398, to compose incentive offer(s) 376, e.g., establish a real-time or nearly real-time insurance benefit rate or discount thereof, or determine promotional content(s), e.g., content(s) 377, to incentivize operator of vehicle 110. As part of aggregation of received performance data, analysis component 504 can compute statistics (e.g., mean, standard deviation and other momenta, etc.), extract patterns; identify data clusters, etc. Empirical, customary rule(s) of operation of vehicle 110, e.g., the norm of operation, can be applied to aggregated data to determine magnitude of changes, e.g., increment or decrement, in insurance benefit(s) rates. Consideration of norm of operation rather than lawful operation of vehicle 110 can result in unchanged insurance benefit rates or unchanged incentive offer(s) in case a fine for a traffic law violation is assessed to an operator of vehicle 110, and the operator pays such fine, if the violation occurred while operator complied with the norm of operation. As an illustration, an operator driving at 67 MPH in a 65 MPH zone may be complying with the norm and thus service provider 120 may not consider such offense detrimental to insurance cost(s) or prospective incentive offer(s).

Upon or after generation of incentive offer(s) 376, service provider platform 120, e.g., through benefit generation component 394, can deliver incentive offer(s) 376 via access network(s) (NTWK(s)) 370, which can be embodied in the example communication framework illustrated in FIG. 2, and can comprise internet infrastructure (e.g., broadband remote access server(s) (B-RAS(s)), digital subscriber line access multiplexer (DSLAM) . . . ) and related connectivity. Election management component 320, via information management component 324, for example, can receive incentive offer(s) 376 and relay such offer(s), or content(s) thereof, to a benefit display component 340, which is part of at least one of operator-machine interface(s) 330. In an aspect, information, e.g., data such as record(s) 374, incentive offer(s) 376, content(s) 377, or signaling 378, can be exchanged amongst election component 320 and access network(s) 370, and access network(s) 370 and service provider platform 120, via, respectively, interfaces 372 and 382. Each of such interfaces 372 and 382 can include at least one of I/O interface components (e.g., modem(s), gateway(s), router(s), server(s) . . . ), wired or wireless links, or the like. Access network(s) 370 also can exchange information (e.g., data, advertisement, signaling, record(s) 374, incentive offer(s) 376, signaling 378 . . . ) via interface 384, which can include at least one of I/O interface components (e.g., modem(s), gateway(s), router(s), server(s) . . . ), wired or wireless links, or the like.

Benefit display component 340 can render the received incentive offer(s) 376, or content(s) thereof, and can collect input from at least one of operator or occupant(s) of the vehicle that hosts election component 320. In an aspect, such input can be received through one or more gestures, such as speech (e.g., voice commands), touch (e.g., screen tap), motion (e.g., hovering over screen, displacement of benefit display component), or the like. As illustrated, benefit display component 340 can be integrated in an operator machine interface 330; however, in one or more embodiments, benefit display component 340 can be a dedicated component or integrated within election component 320 or one of performance collection component(s) 310.

Received operator's input can be a specific election, or an indication thereof, of one or more of the received incentive offer(s) 376, or content(s) thereof. In an aspect, the specific election can include an indication of at least one of scope of supplied performance records or scope and source of content received as part of an elected incentive offer; such indication customizes incentive offer(s) 376 from the perspective of the operator of vehicle 110. Source can include service provider platform 120 or third-party network(s) 150. In an example feature, information management component 324 can commit, within privacy criteria 362, the indication of content(s), and scope and source(s) thereof, authorized to be received as part of the elected incentive offer. The specific election can be conveyed to election component 320 which can relay the election to service provide platform 120, via access network(s) 370, as part of signaling 378. After an election to accept an incentive offer and related insurance benefit plan or content(s), the election can be revoked at substantially any or any time. Benefit display component 340 also can render content(s) 377 associated with an elected incentive offer.

Based on the operator's input, which can be received by service provider platform 120, e.g., via access component 392, as part of signaling 378, benefit generation component 394 can effect term(s) of a particular election of incentive offer(s) 376. For instance, benefit generation component 394 can update an insurance benefit policy to reflect discount(s), or increased or decreased coverage and associated revised insurance benefit rate(s); bill a beneficiary in accordance with updated policy; issue incentive(s) and related content, such as advertisement or other promotional material(s), educational material(s), coupon(s), service credit(s). In addition, as part of effecting the term(s) of elected incentive offer(s), benefit generation component 394 configure one or more of third-party network(s) 150 to direct such network(s) to produce at least one of a portion of incentive(s) (e.g., coupon(s), service credit) or advertisement(s) associated with the particular election of incentive offer(s) 376. Moreover, benefit generation component 394 can convey a directive to information management component 324 to supply at least a portion of performance information, e.g., record(s) 374, to specific third-part network(s) 150. In an example embodiment, e.g., 500, issuance component 508 can configure the one or more third-party network(s) 150 or can convey such a directive to information management component 324. In the alternative or in addition, benefit generation component 394 can authenticate predetermined third-party network(s) 150 with information management component 324 in order for such predetermined third-party network(s) 150 to access at least a portion of performance record(s) 352. In one or more embodiments, e.g., 500, anti-fraud component 516 can implement such authentication in accordance, for example, with one or more conventional authentication mechanisms.

With respect to further aspects of example system 300, information management component 324 can administer rendering of incentive(s) or related content(s), e.g., 377, received in accordance with terms of an accepted incentive offer. In an aspect, information management component 324 can compute a safety metric for a current or substantially current operation condition of vehicle 110 and determine, based at least in part on predefined safety threshold(s), for example, a suitable operation condition to render at least one of incentive(s) or related content(s). In an aspect, computation of the safety metric indicated supra can include data on operation of the vehicle and one or more safety factors, which can be gleaned from the performance data. Computation can be based on disparate levels of intelligence, ranging from utilization of predetermined functions that model safety metrics to autonomous determination of a safety metric. In the latter, correlations amongst available (current, substantially current, historical, etc.) intrinsic and extrinsic data on performance, or operation, can be extracted based on AI methodologies and a safety level, or metric, can be inferred from the extracted knowledge.

Format or packaging of the at least one of incentive offer(s) 376 or related content(s) 377 can be dictated, at least in part, by the suitable operation condition in order to supply sufficient information to convey commercial aspect(s) and not distract operator (e.g., driver of vehicle 110) excessively. Accordingly, in an aspect, the packaging can include a persistence time interval to render content(s) 377. As an example, content(s) 377 related to an accepted incentive offer can be rendered to an operator of a car when the car is stopped at a red traffic light; a condition that can be determined through data collected by camera(s) and speedometer reading(s); such data and reading(s) captured, for example, by one or more of performance collection component(s) 310. The rendered content(s) can be adjusted to a typical time interval that a red traffic light remains actuated. As another example, content(s) such as a set of rich advertisement can be rendered when the vehicle that hosts election component 320 is parked but while the operator is still occupying the vehicle. Based on parking location, information management component 324 can customize the rendered advertisement: If the vehicle is parked near a retailer for which advertisement is available as part of an accepted incentive offer, the rendered advertisement can be linked to merchandise offered for sale at the retailer. Such customization is part of targeted advertisement provided by aspects of the subject disclosure. In one or more embodiments of information management component 324, e.g., example embodiment 400, delivery component 412 can format or package received incentive offer(s) 376 and content(s) 377 associated with an elected incentive offer as described supra. In further embodiment(s), packing component 512 within benefit generation component 394 can format or package content(s), e.g., 377, associated with incentive offers 376 as described supra. Delivery component 412 also can process input received from an operator of vehicle 110 via benefit display component 340, and can compute safety metrics hereinbefore. In an aspect, delivery component 412 can tailor incentive offer(s) or related content in accordance at least in part with available rendering resources or medium, e.g., display screen in a mobile handset or a head-up display in vehicle 110. For a head-up display, delivery component 412 can control projection of the incentive offer(s) 376 or related content, such as advertisement, wherein benefit display component 340 embodies at least in part the head-up display. To minimize distraction caused by rendered incentive offer(s) or related content(s) (e.g., advertisement), delivery component 412 can exploit various elemental indicia such as light sources that span a spectrum of wavelengths (e.g., green, red, yellow . . . ) to convey available discount for insurance benefit(s) in an incentive offer; a coupon value; or available promotional material from a specific retailer or service provider. For example, blue light can indicate promotional material from insurance carrier, whereas green light can convey advertisement from a food retailer. In an embodiment, light sources can be part of benefit display component 340 and can be embodied in light emitting diodes (LEDs).

Moreover, information management component 324 also can select portion(s) of generated record(s) and retain such portion(s) in sampling storage 356 in order to preserve snapshot(s) of historical data on operation that can be utilized to leverage historical performance in a determination of one or more real-time or nearly real-time insurance benefit(s) or incentive offer(s) related therewith. For example, performance records of different longevity, retained in sampling storage 356, can be correlated to determine if specific aspects of operation of vehicle 110, such as observance of posted speed limits is a persistent feature along historical records of operation, or if it is a singular performance aspect directed to eliciting incentive offer(s) with associated low insurance benefit(s) rates. In one or more embodiments, e.g., example embodiment 500, anti-fraud component 516 can download, e.g., request and retrieve upon acknowledgement of the request, historical performance record(s) retained in sampling storage 356, and determined whether a current, nearly-current, or recent performance is fraudulent and geared towards obtainment of artificially low rates for insurance benefit(s). Anti-fraud component 516 also can establish legitimacy of received performance record(s). Anti-fraud component 516 can exploit one or more software or firmware applications, retained as one or more sets of code instructions in application store 530, to make determinations on fraud.

In example system 300, election component 320 also can include information regulation component 328, which can control access to performance record(s) 352—e.g., control of asynchronous delivery of record(s), delivery of record(s) based on schedule, delivery or disclosure of record(s) in response to a request, delivery of record(s) as part of a service. Control can be dictated, at least in part, by a configurable set of regulation rules, stored in memory element 360; configuration of such regulation rules can be implemented in a manner similar to configuration of privacy criteria 362: an operator of vehicle 110 that hosts at least a portion of example system 300 can configure the set of regulation rules. The set of regulation rules enforces access privileges that can be granted to service provider platform 120 or third-party network(s) 150. Additionally, information regulation component 328 can control content, such as incentive package(s) or advertisement(s), associated with elected incentivized time-dependent, e.g., real-time or nearly real-time, insurance benefit(s).

In an aspect of the subject disclosure, content of memory 350 can be transferred amongst vehicles. In a scenario, if a dedicated device, and associated components and circuitry, embodies performance collection component(s) 310, election component 320, and operator-machine interface(s) 330, the device can be removed from a first vehicle (e.g., family car) and functionally fitted in a second vehicle (e.g., a rental car); the fitting can be enabled by an interface such as a Universal Serial Bus (USB) port and associated connector(s). Thus, available performance record(s) 352 and other information can be exploited during operation of the second vehicle (e.g., a rental car). In another scenario, memory 350 can be a removable memory card, and so the knowledge stored therein can be realized in a vehicle through functional fitting of the memory card; in such scenario, election component 320, and components therein, can be retained within the memory card as a set of computer- or device-executable code instructions. In yet another scenario, content of memory 350 can be uploaded to a mobile device, through a suitable interface (e.g., USB port and connector(s), infra-red (IR) interface), and downloaded to a disparate vehicle from the mobile device.

Figure 6:
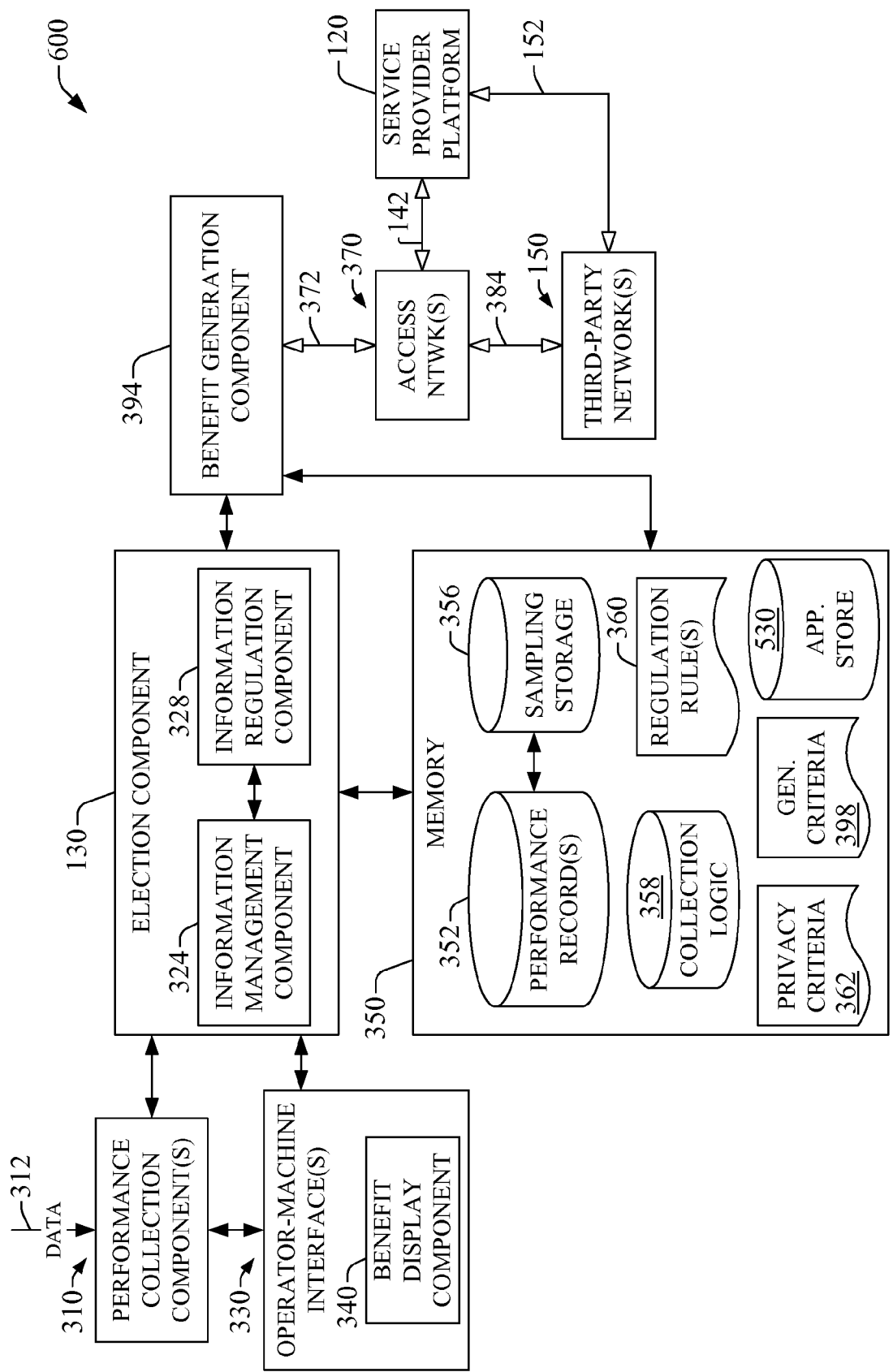
FIG. 6 is a block diagram of an example system that allows incentivation of adoption of real-time or nearly real-time insurance benefit(s) in accordance with features disclosed herein.

In example system 300 described supra, collection of performance information and generation of incentive offer(s) is effected in disparate functional environments. In an alternative or additional example system 600 that enables incentivation of adoption of real-time or nearly real-time insurance benefit(s), both collection of data on performance, or operation, and generation of incentive offer(s) can be conducted within a single functional environment, e.g., on-board the operated vehicle (e.g., 110) for which data is collected. FIG. 6 is a block diagram of such an example system 600.

In example system 600, benefit generation component 394 is local to the vehicle for which performance information is generated. To generate incentive offer(s), as described supra, benefit generation component 394 exploits generation criteria 397 and methodologies or algorithms, retained in application store 530, within memory 350. Terms of accepted incentive offer(s) can be communicated, via access network(s) 370, to at least one of service provider platform 120 or third-party network(s) 150 in order to effect such terms—e.g., update an insurance benefit policy to reflect discount(s), or increased coverage and associated revised insurance benefit rate(s); bill beneficiary in accordance with updated policy; issue content, such as advertisement or other promotional material(s), educational material(s), coupon(s), service credit(s), in accordance with accepted incentive offer(s).

Generation of incentive offer(s) on board of an operated vehicle can reduce signaling over access network(s) 370 and thus improve real-time or nearly real-time aspects of incentive offer(s). In addition, efficiencies related to election of incentive offer(s) can be realized in areas with unreliable or unavailable communication service through access network(s) 370. In an illustrative scenario, generation of incentive offer(s) can proceed even when access network(s) 370 experiences outage due to poor radio link quality, network congestion, or malfunctioning of a main cellular tower or other type of access point, e.g., a metropolitan Wi-Fi AP. In such scenario, accepted term(s) of incentive offer(s) can be logically retained in memory 350 and conveyed to at least one of service provider platform 120 or third-party network(s) 150 upon or subsequent to communication service recovery.

Figure 7:
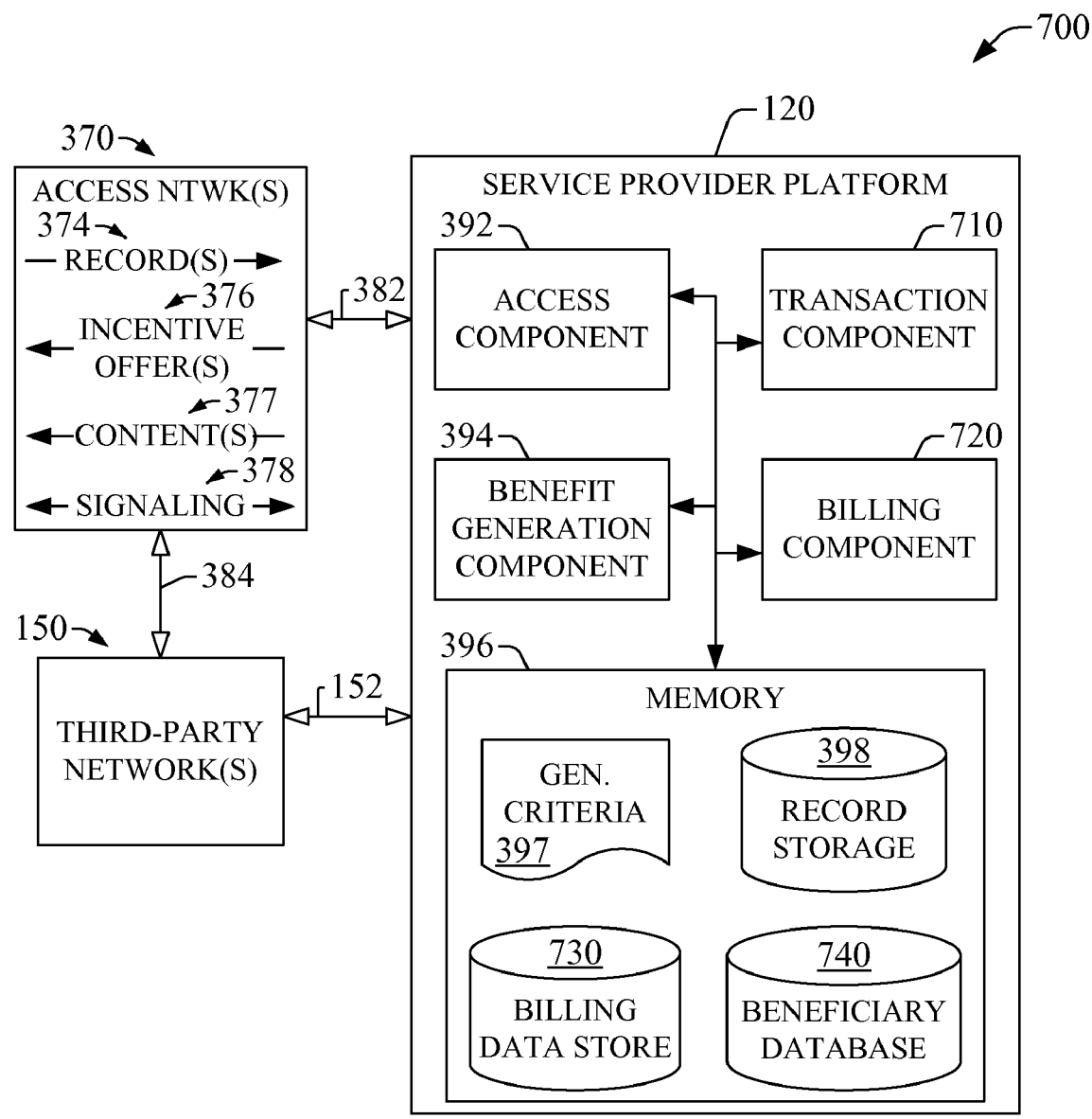
FIG. 7 is a block diagram of an example system that enables monetization of collected operation information of an insured vehicle in accordance with aspects described herein.

FIG. 7 is a block diagram of an example system 700 that enables monetization of collected information on operation of an insured vehicle (e.g., vehicle 110) in accordance with aspects described herein. The subject example system 700 also can be employed to monetize operation information associated with performance of most any or any insured entity, such as a house insured under a home insurance policy or benefit; a person with health insurance coverage or personal injury coverage, or life insurance; or industrial equipment. Financial compensation that originates from monetization of delivery of information on operation of the insured vehicle, or any insured entity for which performance data is available, can be employed to subsidize incentive offers described supra. In an aspect of the subject disclosure, monetization can be accomplished through sale(s) of collected information on operation of the insured entity, e.g., vehicle 110, to third-party network(s) 150. In an example scenario, service provider platform 120 can supply information on operation of the insured vehicle, or most any insured entity, to a third-party network within the set of third-party network(s) 150 and monetize such information through commercialization of advertisement resource associated with the insured entity. In one or more embodiment, aspect, benefit generation component 394 can deliver, or supply, the information on operation of the insured vehicle, or most any insured entity. It should be appreciated that in one or more alternative or additional embodiments, access component 392 also can deliver, or supply, the information on operation of the insured vehicle. In such example scenario, the third-party network can purchase advertisement resources allocated by service provider platform to deliver advertisement content(s) and promotional material(s). Financial compensation associated with purchase of the advertisement resources affords acquisition of the information on operation of the vehicle.

Monetization of information on operation of the insured vehicle, or any other insurance entity, is advantageous to third-party network(s) in view of at least the following. The supplied information on operation of the insured entity can be highly segmented, since service provider platform can select particular groups of one or more insured entities (e.g., vehicles) and associated devices or human agents (e.g., occupant(s) of the insured vehicles). Accordingly, as described supra, advertisement can be highly customized and thus the third-party network or the service provider platform can push advertisement content(s) and promotional material(s) with enhanced likelihood of engagement, e.g., purchase, offline or online store visit(s), subscription to service, adoption of membership in service club(s), such as a wholesale purchase, and so forth.

In an aspect of example system 700, to implement monetization of collected or available information on operation of an vehicle, a transaction component 710 can commit an agreement to supply at least a portion of collected or available information on operation of the vehicle in exchange of payment or compensation from a buyer, e.g., one or more of third-party network(s) 150, of the information. To commit the agreement, for example, transaction component 710 can retain the agreement terms in memory 396, and install or configure a firmware of software application that implements the term(s) of the agreement. The term(s) of the agreement can regulate at least one of the scope of information associated with operation of an insured entity, e.g., the insured vehicle, that is supplied to the third-party network or any other component that consumes the information on operation of the insured vehicle; delivery aspects, such as delivery schedules, delivery events, etc.; duration of the agreement, termination clause(s), or the like. The term(s) of the agreement also can determine one or more allocations of resources for advertisement in at least one of the insured vehicle or a device linked thereto. In an aspect, transaction component 710 can allocate resources for advertisement of a product or service in the insured vehicle or a device linked thereto in accordance with the term(s) of the agreement. In one or more embodiments, to allocate the resources for advertisement, transaction component 710 can execute, at least in part, the installed or configured firmware or software application(s) that implements the term(s) of the agreement. Moreover, the term(s) of the agreement also regulate billing feature(s) of the agreement, wherein the billing feature(s) include at least one of billing model(s), billing cycles, promotional term(s), or the like. To implement billing of the supplied information on operation of the insured entity (e.g., vehicle 110), and effect the monetization thereof, billing component 720 can effect the billing feature(s) of a committed agreement. Billing component 720 can receive the financial compensation in accordance with the billing feature(s) of the committed agreement, or as regulated at least in part by such agreement. Transaction component 710 can configure and retain such features in billing data store 730, which also includes current and historical billing records for a group of third-party networks that have acquired access to a supply of information on operation of the insured entity, e.g., the insured vehicle.

If the information on operation of the insured entity, e.g., vehicle 110, is monetized through commercialization of advertisement resources, billing component 720 can implement various billing models based on response of a beneficiary, e.g., an operator of an insured vehicle, or an agent (human or otherwise) associated therewith to an advertisement impression, e.g., rendered content that composes the advertisement. The advertisement impression can be delivered to a vehicle through access network(s) 370 as part of content(s) 377, as described supra, and the response of the beneficiary or the agent associated therewith, can be received as part of signaling 378, which can be produced by a component, such as benefit display component 340. As an example, at least one of a cost-per-click (CPC) model, a cost-per-gesture (CPG) model, or a cost-per-action (CPA) model can be implemented. Click(s), gesture(s), or action(s) in response to the advertisement impression can incur predetermined charges that are assessed to the third-party network that receives the performance information. The advertisement impression can be rendered in an on-board vehicle display that allows input (e.g., via touch screen) from an operator or an occupant of the vehicle to respond to the advertisement through a click, a gesture, or an action (e.g., purchase of an advertised product).

In an aspect, for response(s) to an advertisement, or advertisement impression that entail an action, transaction component 710 can process, at least in part, the action. For instance, purchases can be enabled through billing information (e.g., credit card record(s)) of a beneficiary associated with the insured entity (e.g., vehicle 110) in which the action occurs.

In another aspect of advertisement, benefit generation component 394 can generate at least part of content associated with advertisement that is pushed to an insured entity, or a component therein (e.g., benefit display component 340), as part of monetization of information on operation of the insured entity. Accordingly, benefit generation component 394 and billing component 720 can form an advertisement platform. Advertisement content also can be generated at the third-party network that consumes (e.g., purchases) the information on operation of an insured entity; and advertisement platform that resides within such third-party network can generated the advertisement content. As discussed supra, advertisement content generated by benefit generation component 394 or an advertisement platform in the third-party network(s), can comprise a set of incentive offers associated with the insurance benefit for the vehicle based in part on at least one of the information on operation of the vehicle and available historical information on operation of the vehicle.

As part of monetization of the information on operation of an insured entity, service provider platform, via, for example, transaction component 710, can adjust the scope of supplied information in accordance with configurable privacy term(s) established by a beneficiary of an insured entity. Such privacy term(s) can be retained in beneficiary database 740, and can complement or supplement privacy settings (e.g., privacy criteria 362) configured by the beneficiary to control the scope of performance information, e.g., record(s) 374, that are provided to service provider platform 120 or third-party network(s) 150. Privacy term(s) and the privacy settings (e.g., privacy criteria 362) can be the same or substantially the same.

In view of the example systems shown and described above, methodologies can be implemented in accordance with the disclosed subject matter, as illustrated in FIGS. 8-12. While, for purposes of simplicity of explanation, the methodologies might be shown and described as a series of blocks, it is to be understood and appreciated that the disclosed aspects are not limited by the number or order of blocks, as some blocks may occur in different orders and/or at substantially the same time with other blocks from what is depicted and described herein. Moreover, not all illustrated and/or described blocks may be required to implement the methodologies described hereinafter. It is to be appreciated that the functionality associated with the blocks may be implemented by software, hardware, a combination thereof or any other suitable means (e.g. device, system, process, component). One example implementation of such functionality can include execution of code instructions retained in a computer-readable medium or a device-readable medium by a processor. Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 8:
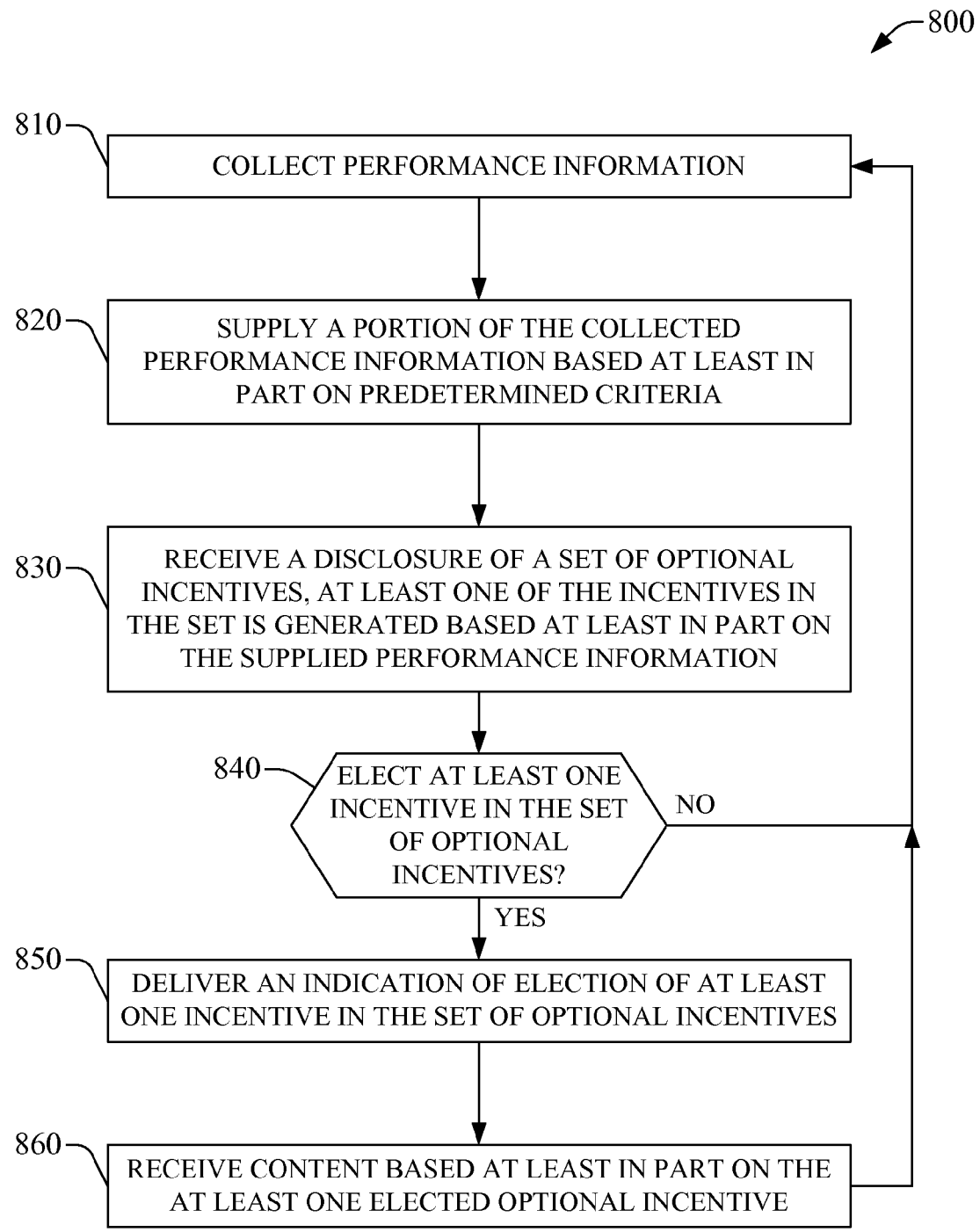
FIG. 8 is a flowchart of an example method for incentivizing adoption of time-dependent insurance benefit(s) according to aspects described herein.

FIG. 8 is a flowchart of an example method 800 for incentivizing adoption of time-dependent insurance benefit(s) according to aspects described herein. At 810, performance information is collected. Collecting the performance information can include retaining it in a memory. Performance information can include operation data of an entity that is insured, or data related to an environment in which the entity operates. In an aspect, collecting performance information can proceed in accordance with predefined collection logic (e.g., collection logic 358), which can dictate, at least in part, scope of performance data to be gathered. In one or more embodiments, collection according to such logic can be advantageous to preserve battery life-span of a mobile device or other performance collection component(s), e.g., 310, that can collect the performance information.

At 820, a portion of the collected performance information can be supplied based at least in part on predetermined criteria. The predetermined criteria can be configured by an insurance beneficiary and thus can represent privacy criteria; the predetermined criteria can be dependent on an intended recipient of the performance information to be supplied. For example, a first set of criteria can be established for a provider of the insurance benefit(s), whereas a second set of criteria can be established for a law enforcement agency or a third-party network.

At 830, a disclosure of a set of optional incentives can be received, at least one of the incentives in the set of optional incentives is generated based at least in part on the supplied performance information. At 840, it is determined if at least one incentive in the set of optional incentives is elected. Determination can be accomplished through detection of input received from an operator of an insured entity (e.g., a motor vehicle) for which the performance information is collected. As described supra, the input can be received through a display component (e.g., 340). An affirmative determination leads to 850, in which an indication of election of at least one incentive in the set of optional incentives is delivered. The election also can convey a level of performance information that is agreed to be delivered as part of enjoying the elected benefit. Conversely, flow is directed to 810, in which additional performance information is collected.

At 860, content based at least in part on the at least one elected optional incentive is received. Content can include at least one of notification of an elected insurance benefit and feature(s) thereof (rate, acquired insurance coverage, insured entities, etc.); educational material related to insured entity, such as defensive driving tips if case of car insurance, benefits of exercising for blood glucose management in case of health insurance; an advertisement; a merchandise coupon; a service voucher (a pass-code to prepaid wireless minutes, a pass-code to media content downloadable from a website, etc) or a service credit and notification thereof; or the like. Subsequent to enactment of 860, flow is directed to 810, for further collection of performance information.

Figure 9:
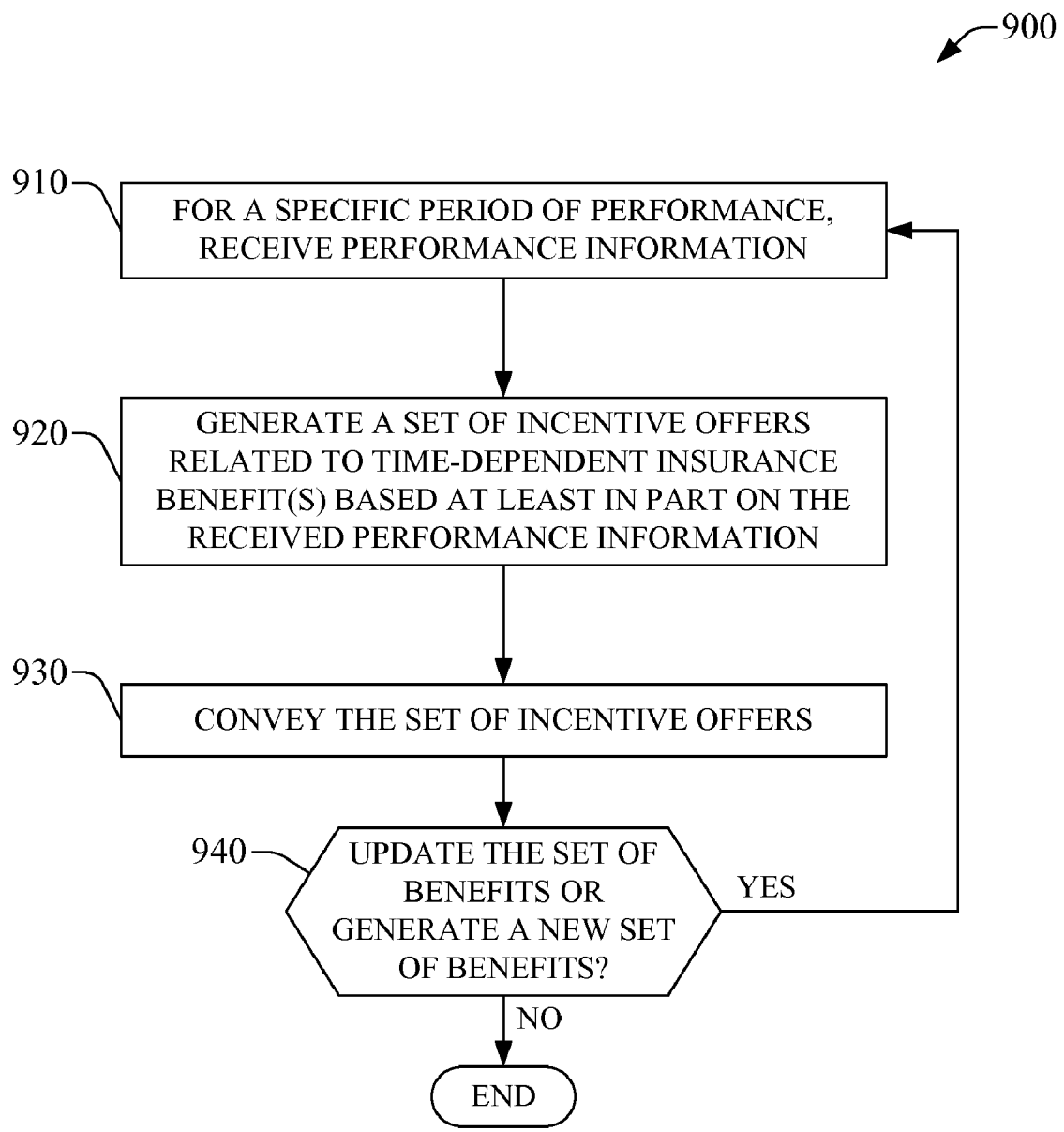
FIG. 9 is a flowchart of an example method for issuing a set of incentive offer(s) to engage time-dependent insurance benefit(s) according to aspects described herein.

FIG. 9 is a flowchart of an example method 900 for issuing a set of incentive offer(s) to engage time-dependent insurance benefit(s) according to aspects described herein. At 910, for a specific period of performance, performance information is received. Metadata related to the performance information, e.g., data that identifies data that comprises the performance information can be received. Metadata can include identity of an operator for which the incentive offer(s) is directed, timestamps, incentive preferences, etc. Receiving performance information, and associated metadata, can include storing the performance information or the metadata. In an aspect, the period of performance can be adaptive, e.g., autonomously or automatically adjustable, and linked to the performance information that is collected; for instance, if velocity of a vehicle is included in the performance information and vehicle acceleration is zero or substantially zero, then performance period can be relatively long and adjusted, e.g., reduced, when acceleration becomes measurably different from zero.

At 920, a set of incentive offers related to time-dependent insurance benefit(s) is generated based at least in part on the received performance information. The set of incentive offers can include the optional incentives discussed supra in connection with example method 700. In particular, incentive offer(s) can include provision of insurance benefit(s) at deeply discounted rates, e.g., almost free-of-charge, in exchange for rich, highly detailed performance information. At 930, the set of incentive offers is conveyed.

At 940, it is determined if the set of incentive offers is to be updated or a new set of incentive offers is to be generated. Determination can be based at least in part on the received performance information and historical performance information available to a functional element that enacts the subject example block or method. As an illustration, if received performance information displays substantially the same correlations as available historical data, e.g., a moving average of velocity remains unchanged, then, the set of incentive offers need not be updated. Determination also can be based at least in part on signaling received in response to the delivered set of incentive offer(s); in particular, if an indication to revoke delivery of incentive offer(s) is received, no further set of incentive offer(s) are updated or generated. If outcome of 940 is affirmative, flow is directed to act 910. Conversely, the subject example method can be terminated.

Figure 10:
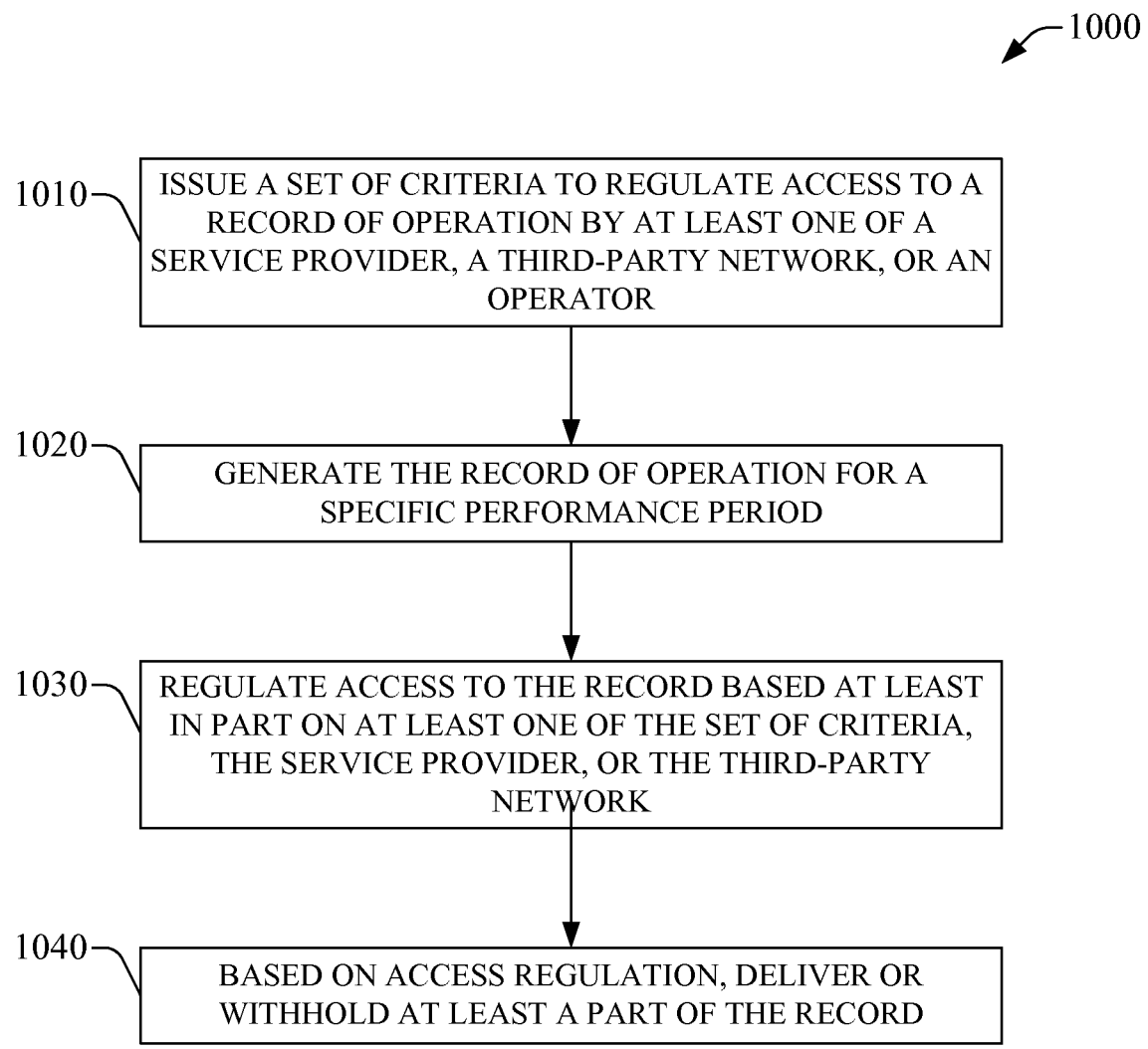
FIG. 10 displays a flowchart of an example method for providing performance record(s) according to aspects disclosed herein.

FIG. 10 displays a flowchart of an example method 1000 for providing operation record(s) according to aspects disclosed herein. At 1010, a set of criteria to regulate access to a record of operation (e.g., record(s) 374) by at least one of a service provider, a third-party network, or an operator is issued. In an aspect, the set of criteria is configurable and can be issued asynchronously; an operator of a vehicle that is insured by the service provider can configure the set of criteria. An operator-machine interface can enable configuration of the set of criteria by receiving information that compose one or more rules that define the set of criteria, and retaining the information in a computer-readable medium (e.g., memory 350). The set of criteria can establish selective masking of information on operation (e.g., information 134 or record(s) 374) by determining a group of entities that can access, or is allowed access to, the record of performance (e.g., record(s) 374). As an example, a service provider (e.g., insurance carrier) can access record(s) of velocity of an insured vehicle, whereas a law enforcement agency (e.g., police) can be barred from accessing such record(s) of velocity if it reveals the vehicle is speeding. As another example, a parent of a teenage driver can receive any record(s) of performance related to a vehicle operated by the teenage driver.

At 1020, the record of performance for a specific performance period is generated. As described supra, for example, the performance period can be adaptive and adjusted according to the particular record of performance. At 1030, access to the record of operation is regulated based at least in part on at least one of the set of criteria, the service provider, or the third-party network. At 1040, based on access regulation, at least part of the records is delivered or withheld.

Figure 11:
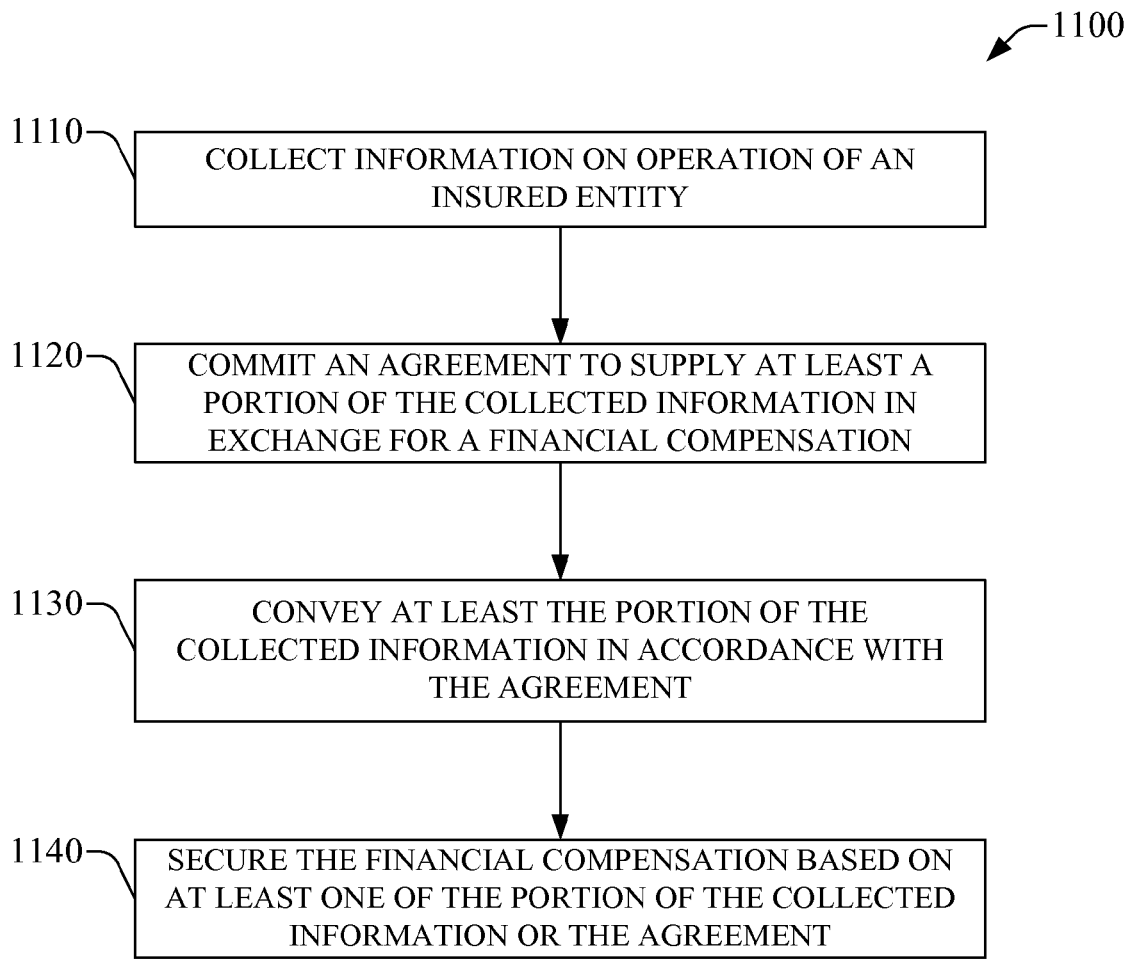
FIG. 11 is a flowchart of an example method for monetizing operation information of an insured entity in accordance with aspects described herein.

FIG. 11 is a flowchart of an example method 1100 for monetizing operation information of an insured entity in accordance with aspects described herein. At 1110, information on operation of an insured entity is collected. The insured entity can be a motor vehicle, a facility (e.g., house, business location), a living agent, such as a person or an animal, or the like. At 1120, an agreement to supply at least a portion of the collected information in exchange for a financial compensation is committed. Committing the agreement can include retaining terms of the agreement in a memory, and installing or configuring firmware or software application(s) (or set of devices or set of code instructions that compose such application(s)) that implements the term(s) of the agreement. In addition, committing the agreement also can include delivering the term(s) of the agreement to a party, e.g., third-party network component, and an indication that the agreement is current and in force. At 1130, at least the portion of the collected information is conveyed in accordance with the committed agreement. The recipient of at least the portion of information that is conveyed can be the party, e.g., third-party network component, that consumes the information. At 1140, the financial compensation is secured based on at least the portion of the collected information that is conveyed or the committed agreement. In an aspect, securing the financial compensation can include generating billing records for the information that is supplied to the party that consumes such information, and delivering billing invoices to such party.

Figure 12:
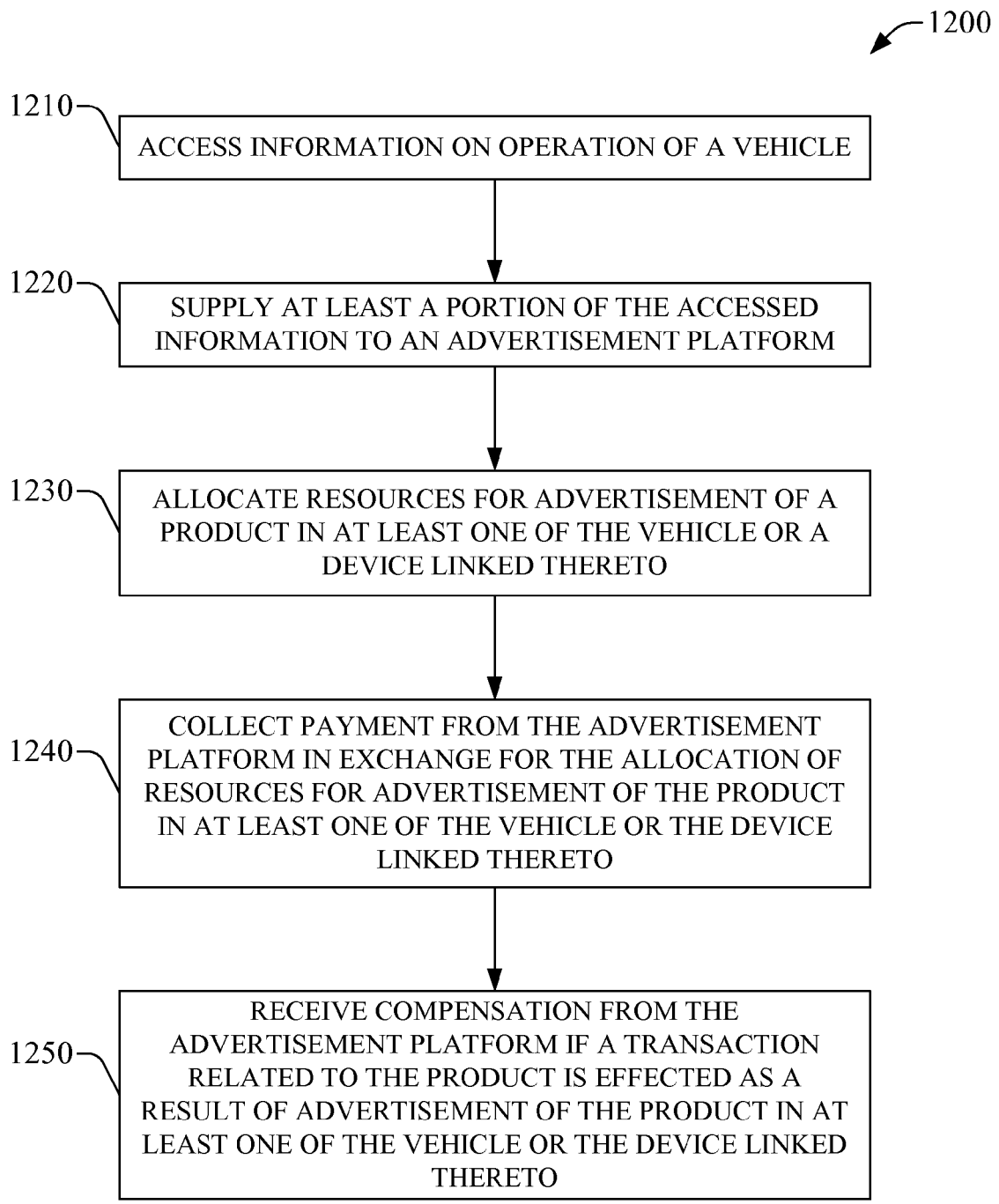
FIG. 12 displays a flowchart of an example method for monetizing available performance information according to aspects described herein.

FIG. 12 displays a flowchart of an example method 1200 for monetizing available performance information according to aspects described herein. While illustrated with respect to operation of a vehicle and information associated with such operation, the subject example method 1200 can be effected for other entities, such as a person, a house, a business, or the like. In addition, the subject example method 1200 is an example of method 1100. One or more blocks of example method 1200 can be implemented as part of example method 1100. At 1210, information on operation, or performance, of a vehicle is accessed. The information can be raw time-dependent intrinsic data or extrinsic data (see description of FIG. 1) or aggregated vehicle operation data, e.g., a pattern of acceleration within a predetermined performance period, a pattern of stop-and-go operation for a set of rush-hour periods in a predetermined route, destination location listing for past M trips, with M a natural number, etc. Accessing the information on operation can include receiving performance data, or records; in an example scenario, access component 392 receives the information on operation. At 1220, at least a portion of the accessed information is supplied to an advertisement platform (which can be embodied, for example, in benefit generation component 394 and billing component 720). The advertisement platform can be part of a service provider (e.g., service provider platform 120) that furnishes insurance benefit(s) for the vehicle for which operation information is accessed. In the alternative or in addition, the advertisement platform also can be part of a third-party network (e.g., 150) that is functionally coupled to the service provider.

At 1230, resources for advertisement of a product in at least one of the vehicle or a device linked thereto are allocated. Advertisement of the product can be tailored to aspects of the accessed information on operation, which can reveal contextual information related to an operator or occupant(s) of the vehicle. Thus, such advertisement and the product itself can be accurately targeted to the operator or occupant(s) or focused on the vehicle. The device can be integrated in the vehicle, e.g., navigation system, maneuvering system, head-up display, or the like. In addition or in the alternative, the device can be most any add-one device in the vehicle, such as a satellite-based navigation unit, or a most any electronic appliance, e.g., mobile device(s) utilized by an operator or occupant of the vehicle. The device integrated to the vehicle, the add-on device, or the electronic appliance can render information to an end user (e.g., the operator or occupant of the vehicle) via, for example, a display screen, a loud speaker or any other one or more components that can supply sound, images, token(s), or stimuli that deliver information to the end user. The resources that are allocated for advertisement can include radio channel(s) or radio airtime in which advertisement can be delivered. Additionally or alternatively, resources can include at least one of (i) space in on-board displays in the vehicle, such as display of a navigation unit, a dashboard, section(s) of windshield, portion(s) of steering wheel, or a dedicated device, and associated component(s) and circuitry, that manages collection of operation information; or (ii) space in display(s) in the device linked, functionally or otherwise, to the vehicle. In a scenario in which the subject example method is effected for a person as the insured entity, a device that is linked to the person, and in which resources for advertisement are allocated, can be a wearable device or portable device, such as a helmet-mounted display, a head-mounted display (e.g., glasses), a pedometer; a mobile telephone, a media player, or the like. In an alternative or additional scenario in which the subject example method is effected for a house as the insured entity, the device that is linked to the house, and in which resources for advertisement are allocated, can be most any or any electronic or electric appliance that operates in the house and can render information to an end user via, for example, a display screen, a loud speaker or any other mechanism or component that can convey sound, images, or other stimuli that convey information. For instance, the device can be a television set, a radio tuner set, a wireline telephone device with display component(s) (e.g., a display screen), or the like.

At 1240, payment is collected from the advertisement platform in exchange for the allocation of resources for advertisement of the product in at least one of the vehicle or device linked thereto. In an aspect, collecting payment includes utilizing one or more models of payment based on feedback or response from an operator or occupant of the vehicle to the advertisement of the product. For instance, at least one of a cost-per-click (CPC) model, a cost-per-gesture (CPG) model, or a cost-per-action (CPA) model can be implemented in which predetermined charges are assessed to the advertisement platform if advertisement is rendered in an on-board vehicle display that allows input (e.g., via touch screen) from an operator or occupant of the vehicle, and an occupant of the vehicle responds to the advertisement through a click or an action. It should be appreciated that, in one or more embodiments, CPC model can be part of a cost-per-gesture (CPG) model in which, for instance, speech or motion response to advertisement (e.g., an operator verbally requests details on advertised product through radio equipment that renders advertisement) can be accounted as feedback to the advertisement and thus incur charges for advertisement platform.

At 1250, compensation is received from the advertisement platform if a transaction related to the product is effected as a result of the advertisement of the product in at least one of the vehicle or the device linked thereto. In an aspect, the transaction can be effected during operation of the vehicle and by directing a gesture to a dedicated operator-machine interface in the vehicle for which information on operation is accessed or advertisement is rendered.

A service provider (e.g. insurance carrier) that affords insurance benefit(s) for the vehicle can employ at least one of the payment or compensation from the advertisement platform to subsidize insurance benefit(s), e.g., insurance coverage, for the vehicle and thus incentivize specific types of insurance benefit(s), such as real-time or nearly real-time insurance coverage plans. In addition, for the service provider (e.g., insurance carrier), such payment or compensation can mitigate financial risk(s) associated with provision of insurance benefit(s) since the payment or the compensation is a source of revenue that originates from operation of the vehicle, which is the source of risk(s) associated with insurance coverage. Moreover, at least one of payment or compensation can subsidize at least part of cost of specific service(s) utilized by operator(s) or occupant(s) of the vehicle for which information on operation, or performance, of the vehicle is accessed; the specific service(s) can include wireless service, vehicle maintenance or repairs, or the like. In one or more scenarios, subsidies can render the specific service(s) free-of-charge through rebates or service vouchers: As an example, insurance carrier or advertisement platform can liquidate at least a portion of cost of delivering mobile instant messages from within the vehicle for which information on operation is accessed. As another example, insurance carrier can pay (e.g., reimburse) expense of routine oil and lube changes for the vehicle for which information on operation is accessed.

Figure 13:
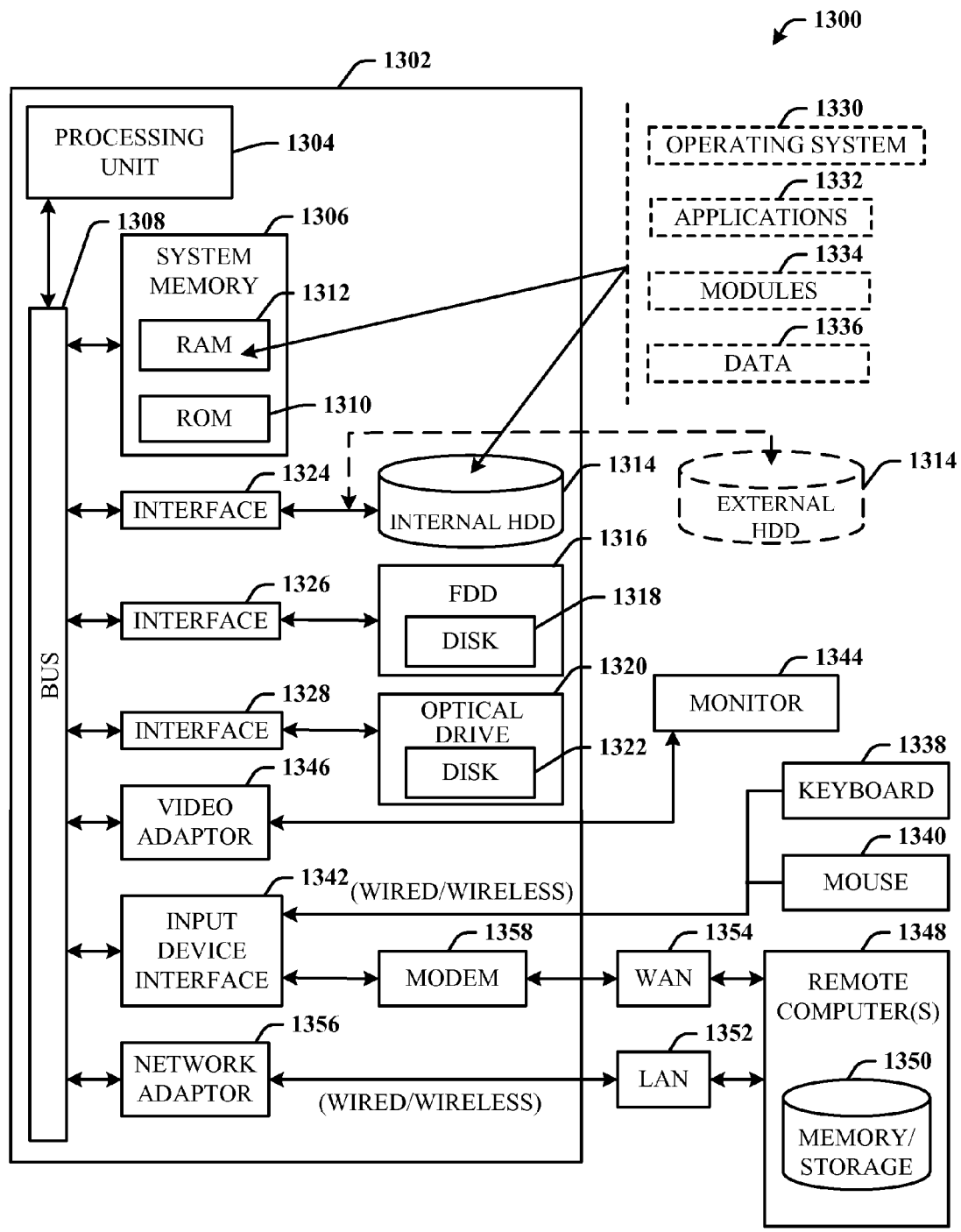
FIGS. 13-14 illustrate block diagrams of computing environments that can execute or implement the disclosed aspects.

Referring now to FIG. 13, there is illustrated a block diagram of a computer environment that can execute or implement the disclosed architecture or portion(s) thereof. In order to provide additional context for various aspects disclosed herein, FIG. 13 and the following discussion are intended to provide a brief, general description of a suitable computing environment 1300 in which the various aspects can be implemented. While the one or more aspects have been described above in the general context of computer-executable instructions that may run on one or more computers, those skilled in the art will recognize that the various aspects also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 13, the exemplary environment 1300 for implementing various aspects includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures may also be employed as the processing unit 1304.

The system bus 1308 can be any of several types of bus structure that may further interconnect to a memory bus (with or without a memory controller), a peripheral bus, and a local bus using any of a variety of commercially available bus architectures. The system memory 1306 includes read-only memory (ROM) 1310 and random access memory (RAM) 1312. A basic input/output system (BIOS) is stored in a non-volatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching data.

The computer 1302 further includes an internal hard disk drive (HDD) 1314 (e.g., EIDE, SATA), which internal hard disk drive 1314 may also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies. Other external drive connection technologies are within contemplation of the one or more aspects.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods disclosed herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is appreciated that the various aspects can be implemented with various commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1344 or other type of display device is also connected to the system bus 1308 through an interface, such as a video adapter 1346. In addition to the monitor 1344, a computer typically includes other peripheral output devices (not shown), such as speakers, printers, etc.

The computer 1302 may operate in a networked environment using logical connections through wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which may connect to a global communications network, e.g., the Internet.

When used in a LAN networking environment, the computer 1302 is connected to the local network 1352 through a wired and/or wireless communication network interface or adapter 1356. The adaptor 1356 may facilitate wired or wireless communication to the LAN 1352, which may also include a wireless access point disposed thereon for communicating with the wireless adaptor 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 through the serial port interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from home, in a hotel room, or at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 14:
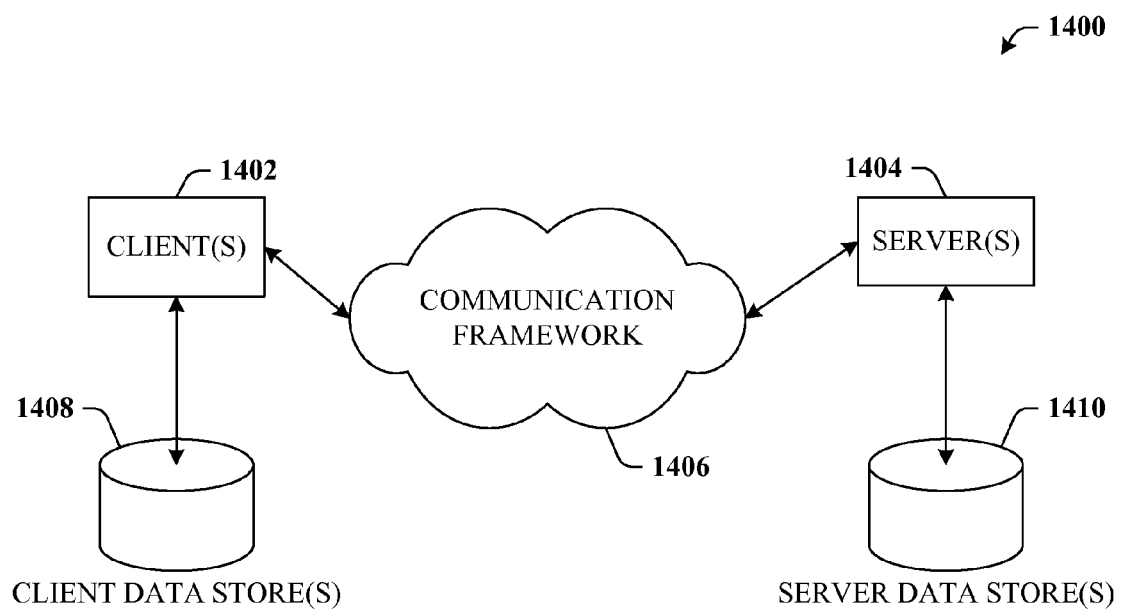

Referring now to FIG. 14, there is illustrated a schematic block diagram of an exemplary computing environment 1400 in accordance with the various aspects. The system 1400 includes one or more client(s) 1402. The client(s) 1402 can be hardware and/or software (e.g., threads, processes, computing devices). The client(s) 1402 can house cookie(s) and/or associated contextual information by employing the various aspects, for example.

The system 1400 also includes one or more server(s) 1404. The server(s) 1404 can also be hardware and/or software (e.g., threads, processes, computing devices). The servers 1404 can house threads to perform transformations by employing the various aspects, for example. One possible communication between a client 1402 and a server 1404 can be in the form of a data packet adapted to be transmitted between two or more computer processes. The data packet may include a cookie and/or associated contextual information, for example. The system 1400 includes a communication framework 1406 (e.g., a global communication network such as the Internet) that can be employed to facilitate communications between the client(s) 1402 and the server(s) 1404.

Communications can be facilitated through a wired (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts, blocks and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising."

The term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

In the subject specification and annexed drawings, terms such as "store," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. Moreover, a memory component can be affixed to a disparate component or removable there from.

Furthermore, the one or more aspects may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

What is claimed is:

1. A system, comprising:
   a processor;
   a non-transitory computer-readable storage medium communicatively coupled to the processor and storing computer executable components to facilitate operation of components comprising:
   a performance collection component configured to:
     identify an operator of a vehicle; and
     supply at least one performance record generated based in part on at least one of information describing real-time operation of a vehicle by the operator or information describing an operation environment of the vehicle by the operator;
   an information management component configured to:
     receive at least one of the real-time operation information or the operation environment information;
     infer a destination of the vehicle based at least in part on prior destination information contained in aggregated data pertaining to prior operation of the vehicle by the operator in conjunction with at least one of the real-time operation information or operation environment information;
     identify a lifestyle choice of the operator; and
     identify a third-party located at the inferred destination offering a commodity that matches the operator lifestyle choice;
   a benefit generation component configured to forward an advertisement generated by the third-party; and
   a display component configured to:
     render the advertisement; and
     collect indication of acceptance of the advertisement.

2. The system of claim 1, wherein the performance record is specific to the operator and is transferrable from the vehicle to a disparate vehicle.

3. The system of claim 1, further comprising a selection component configured to expose the performance record to the third party based at least in part on a privacy criteria.

4. The system of claim 1, further comprising an information regulation component configured to control access to the performance record.

5. The system of claim 1, wherein the display component is configured to be removably attached to the vehicle and receives input from the operator through at least one of a speech gesture, touch gesture, or a motion gesture.

6. The system of claim 1, wherein the performance collection component is a mobile device functionally coupled to a component that supplies the performance record.

7. A method, comprising:
   employing at least one computer processor to execute code instructions retained in a computer-readable medium, the executed code instructions implement the following acts:
   identifying an operator of a vehicle;
   identifying a lifestyle choice of the operator;
   collecting performance information of the vehicle by the operator;
   supplying the collected performance information based in part on predetermined criteria;
   inferring a destination of the vehicle based at least in part by comparing the collected performance information with at least one destination identified in response to data mining of at least one record aggregated during operation of a vehicle by the operator;
   identifying a third-party located at the inferred destination offering a commodity matching the operator lifestyle choice;
   receiving an advertisement generated by the third-party based at least in part on the operator lifestyle choice;
   presenting the advertisement to the operator while operating the vehicle in the direction of the inferred location; and
   in the event of the advertisement being selected:
     delivering an indication of the selection of the advertisement; and
     receiving content based on the selected advertisement.

8. The method of claim 7, the supplying includes:
   issuing a criteria regulating access to the performance record by at least one of a service provider, a third-party network, or the operator;
   generating the performance record for a specific performance period; and
   regulating access to the performance record based at least in part on at least one of the criteria, the service provider, or the third-party network.

9. The method of claim 8, further comprising determining compliance with the access regulation facilitating delivery of the performance record.

10. The method of claim 8, wherein the criteria establishing selective masking of the performance record by determining a group of entities allowed access to the performance record.

11. A system comprising a non-transitory computer-readable storage medium having computer-executable instructions that, in response to execution, cause a computing system to perform operations comprising:
   identifying an operator of a vehicle;
   conveying a performance record generated based in part on at least one of real-time operation information of the vehicle by the operator or information of an operation environment of the vehicle being operated by the operator;

inferring a destination of the vehicle based at least in part by comparing the collected performance record with at least one destination identified in response to data mining of at least one record aggregated during prior operation of a vehicle by the operator;

identifying a lifestyle choice of the operator;

identifying a third-party located at the inferred destination offering a commodity matching the operator lifestyle choice;

receiving an advertisement generated by the third-party relating to the operator lifestyle choice;

rendering the advertisement; and collecting an indication of acceptance or rejection of the advertisement by the operator.

12. The system of claim 11, wherein the performance record being collected as part of a service provisioning insurance coverage for the operator.

13. The system of claim 1, wherein identification of the operator is facilitated by at least one of a radio frequency identification device associated with the operator, information provided by a mobile handset associated with the operator, or information received from a biometric device located in the steering wheel of the vehicle.

14. The system of claim 1, wherein the identification of the lifestyle choice is based at least in part on information provided by the operator during obtainment of insurance coverage or inferred from the aggregated data pertaining to prior operation of the vehicle by the operator.

15. The system of claim 1, wherein the performance record is collected as part of a service provisioning insurance coverage for the operator.

16. The system of claim 15, wherein the third-party pays an entity provisioning the insurance coverage to supply the advertisement.

17. The method of claim 7, wherein the identifying of the operator being facilitated by at least one of a radio frequency identification device associated with the operator, information provided by a mobile handset associated with the operator, or information received from a biometric device located in the steering wheel of the vehicle.

18. The method of claim 7, wherein the identifying of the lifestyle choice being based at least in part on information being provided by the operator during obtainment of insurance coverage or being inferred from the aggregated data pertaining to prior operation of the vehicle by the operator.

19. The system of claim 11, wherein the identifying of the operator being facilitated by at least one of a radio frequency identification device associated with the operator, information provided by a mobile handset associated with the operator, or information received from a biometric device located in the steering wheel of the vehicle.

20. The system of claim 11, wherein the identifying of the lifestyle choice being based at least in part on information being provided by the operator during obtainment of insurance coverage or being inferred from the aggregated data pertaining to prior operation of the vehicle by the operator.

* * * * *